No. 811,783. PATENTED FEB. 6, 1906.
H. C. LAVERY.
STAMPING PRESS.
APPLICATION FILED DEC. 12, 1902.
12 SHEETS—SHEET 3.
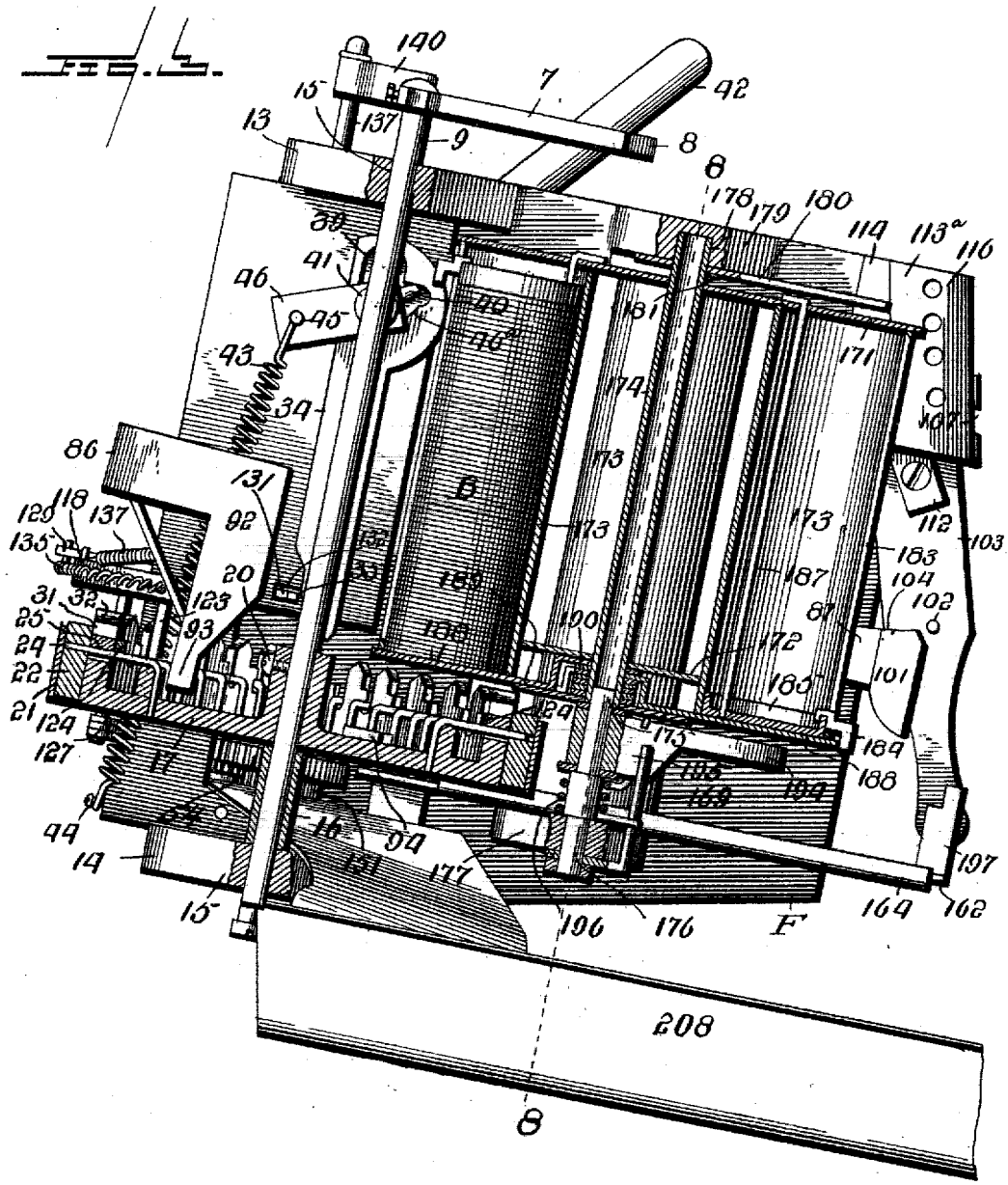
WITNESSES:
Wm. F. Doyle.
G. S. Roy.
INVENTOR
Henry C. Lavery.
By
D. T. Wolhaupter, Attorney No. 811,783. PATENTED FEB. 6, 1906.
H. C. LAVERY.
STAMPING PRESS.
APPLICATION FILED DEC. 12, 1902.
12 SHEETS—SHEET 4.
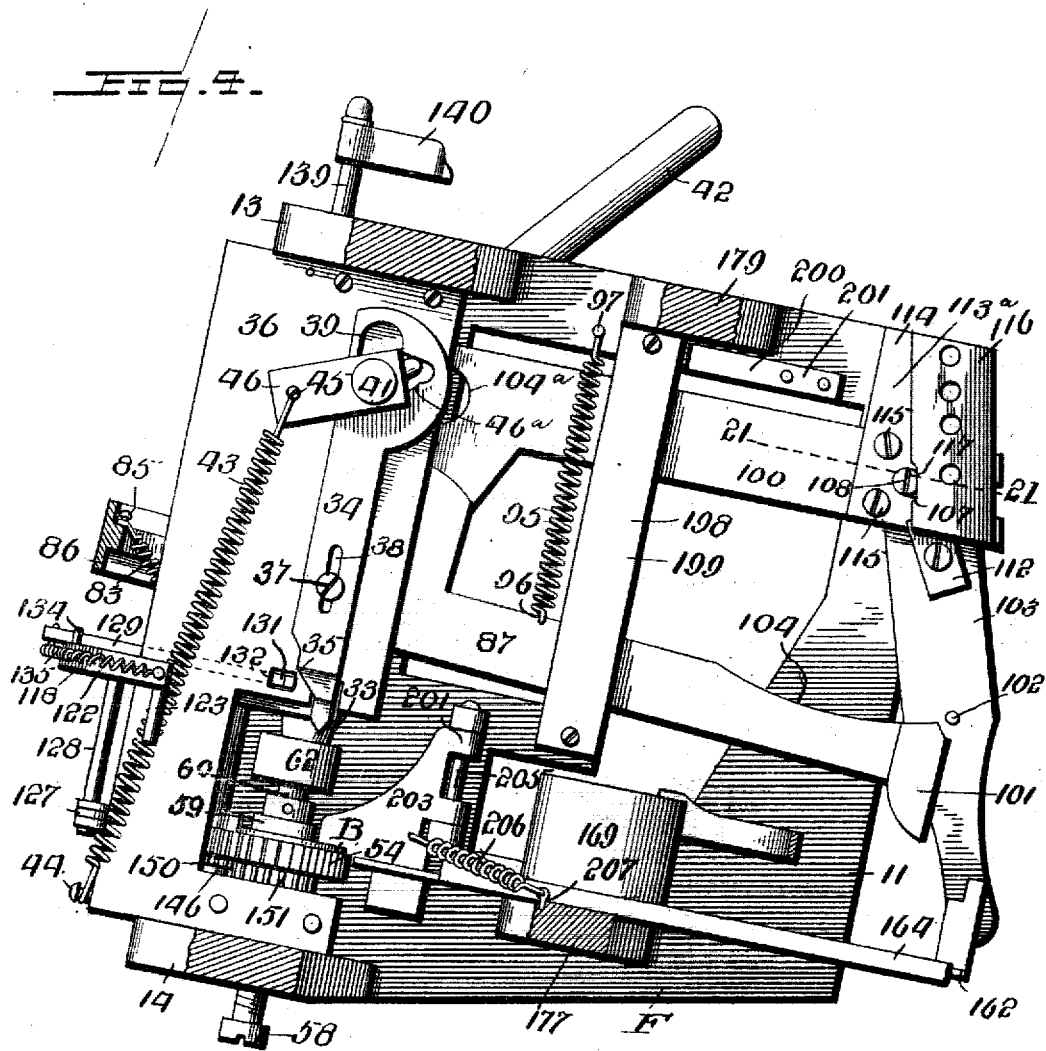
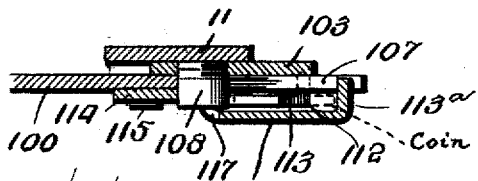
WITNESSES:
Wm. F. Doyle.
G. S. Roy.
INVENTOR
Henry C. Lavery.
By D. P. Wolhaupter, Attorney No. 811,783. PATENTED FEB. 6, 1906.
H. C. LAVERY.
STAMPING PRESS.
APPLICATION FILED DEC. 12, 1902.
12 SHEETS—SHEET 5.
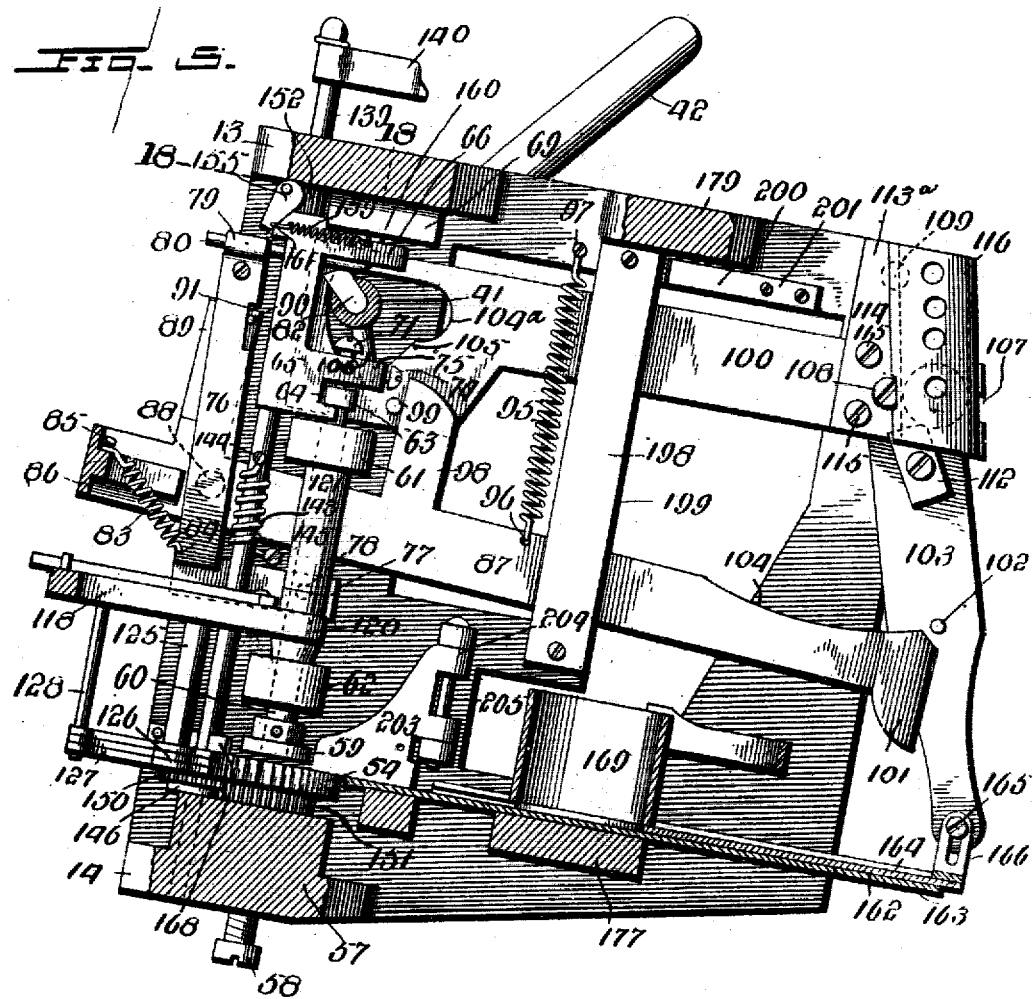
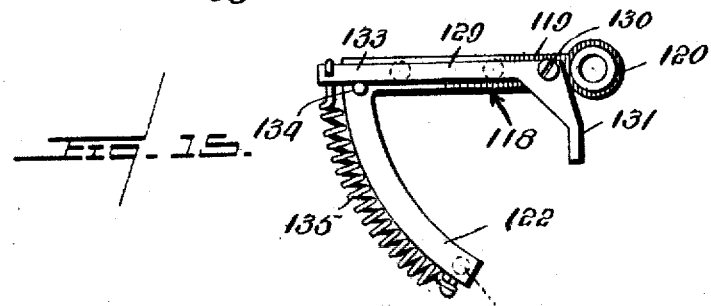
WITNESSES
W. F. Doyle.
G. S. Roy.
INVENTOR
Henry C. Lavery.
By D. T. Wolhaupter, Attorney

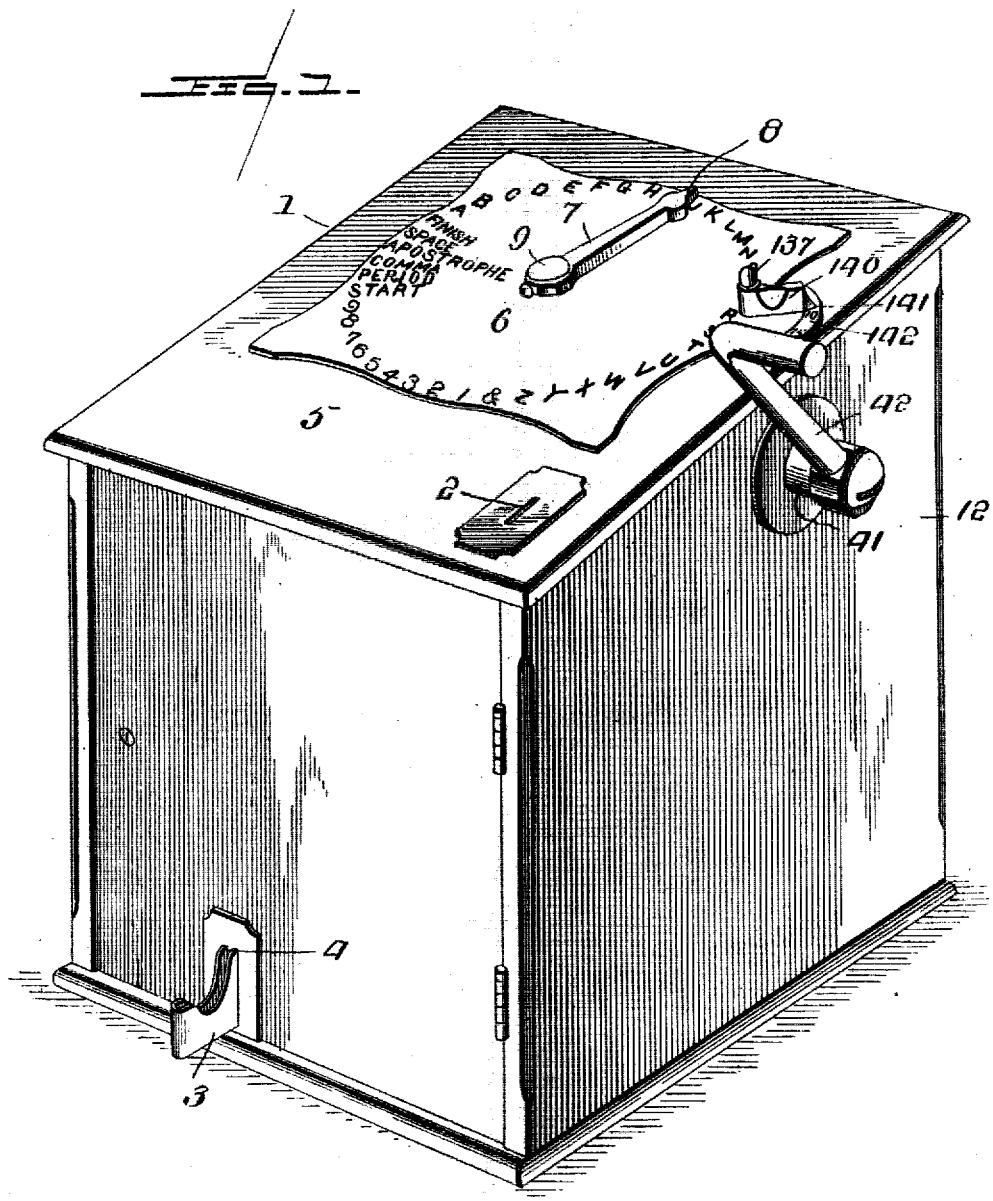

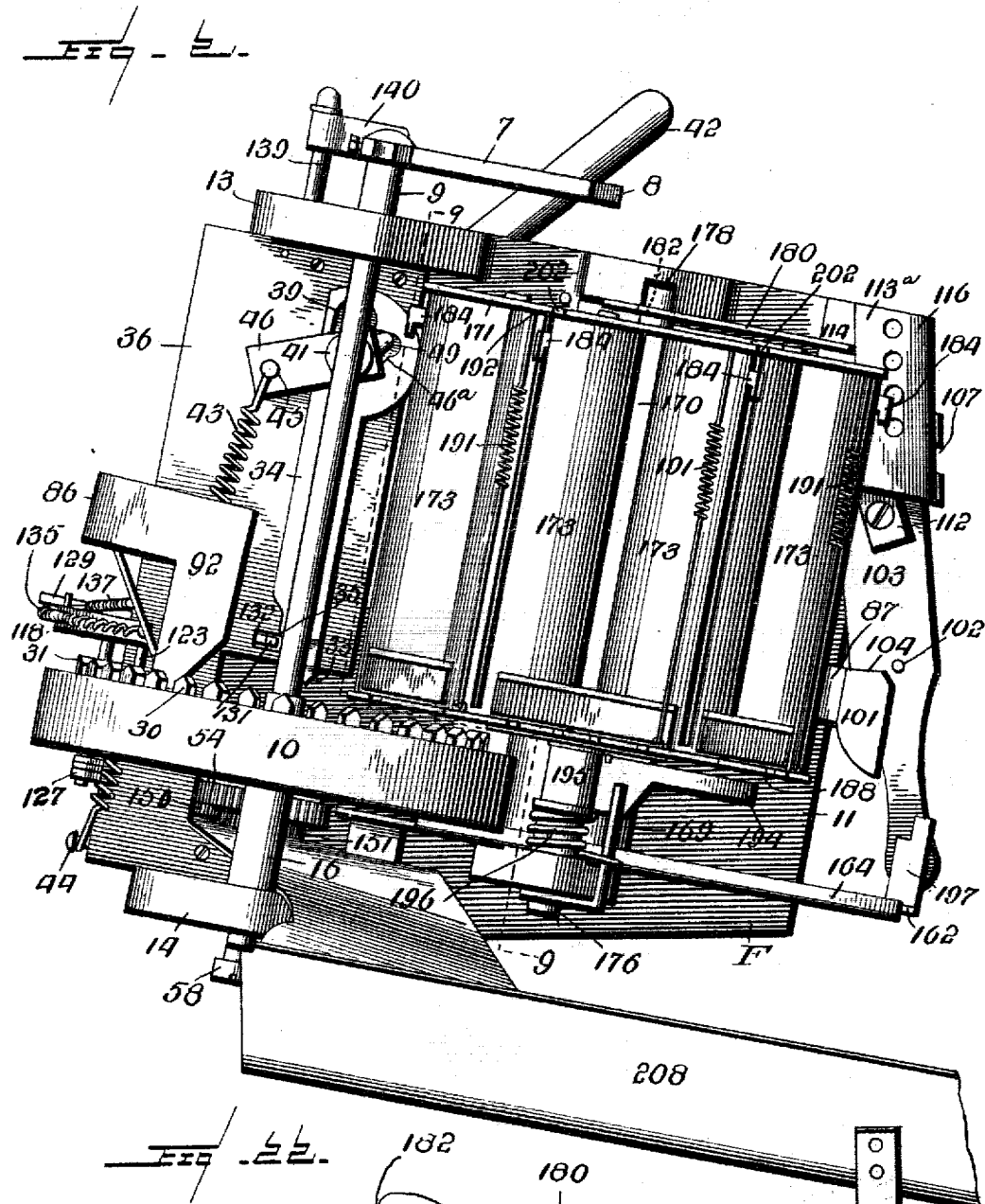

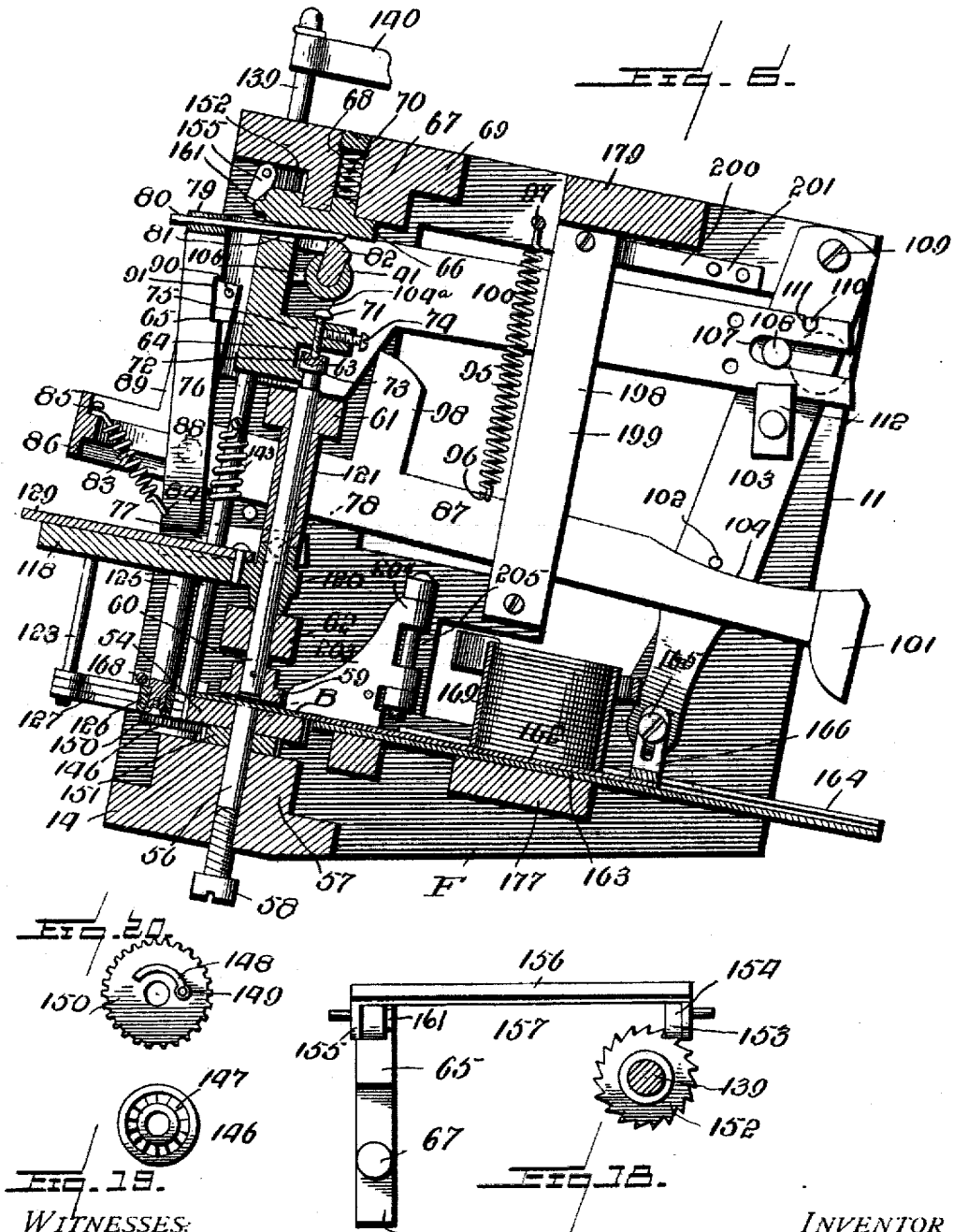

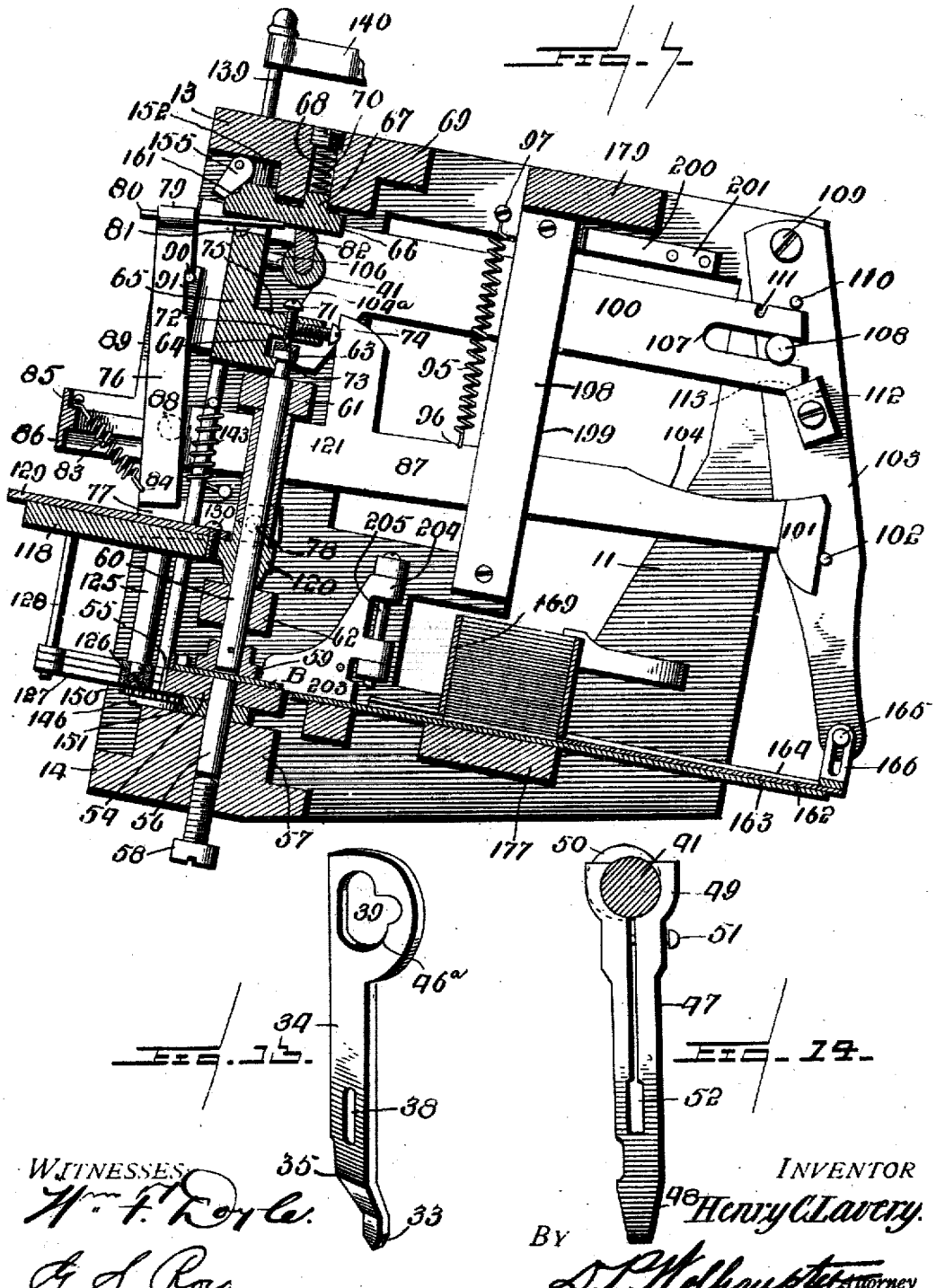

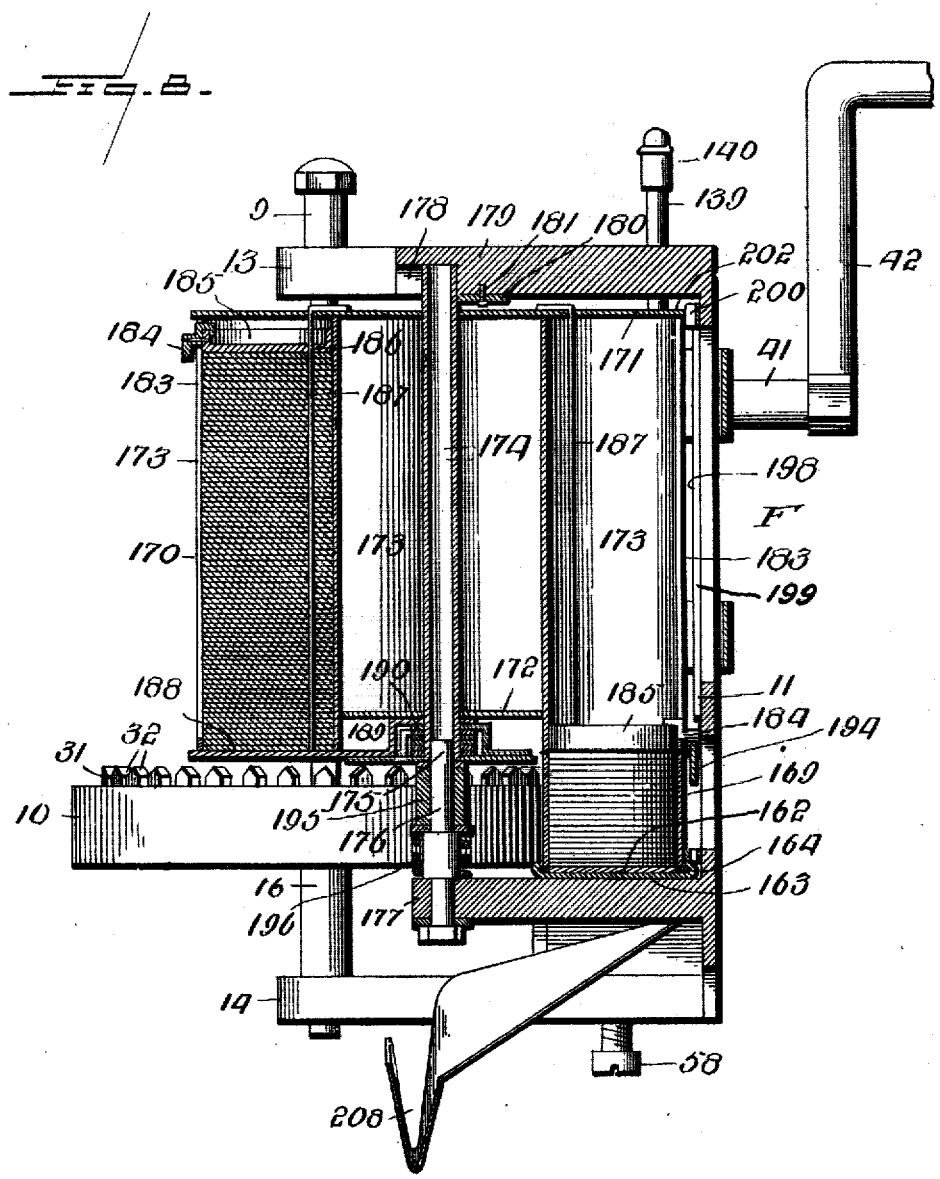

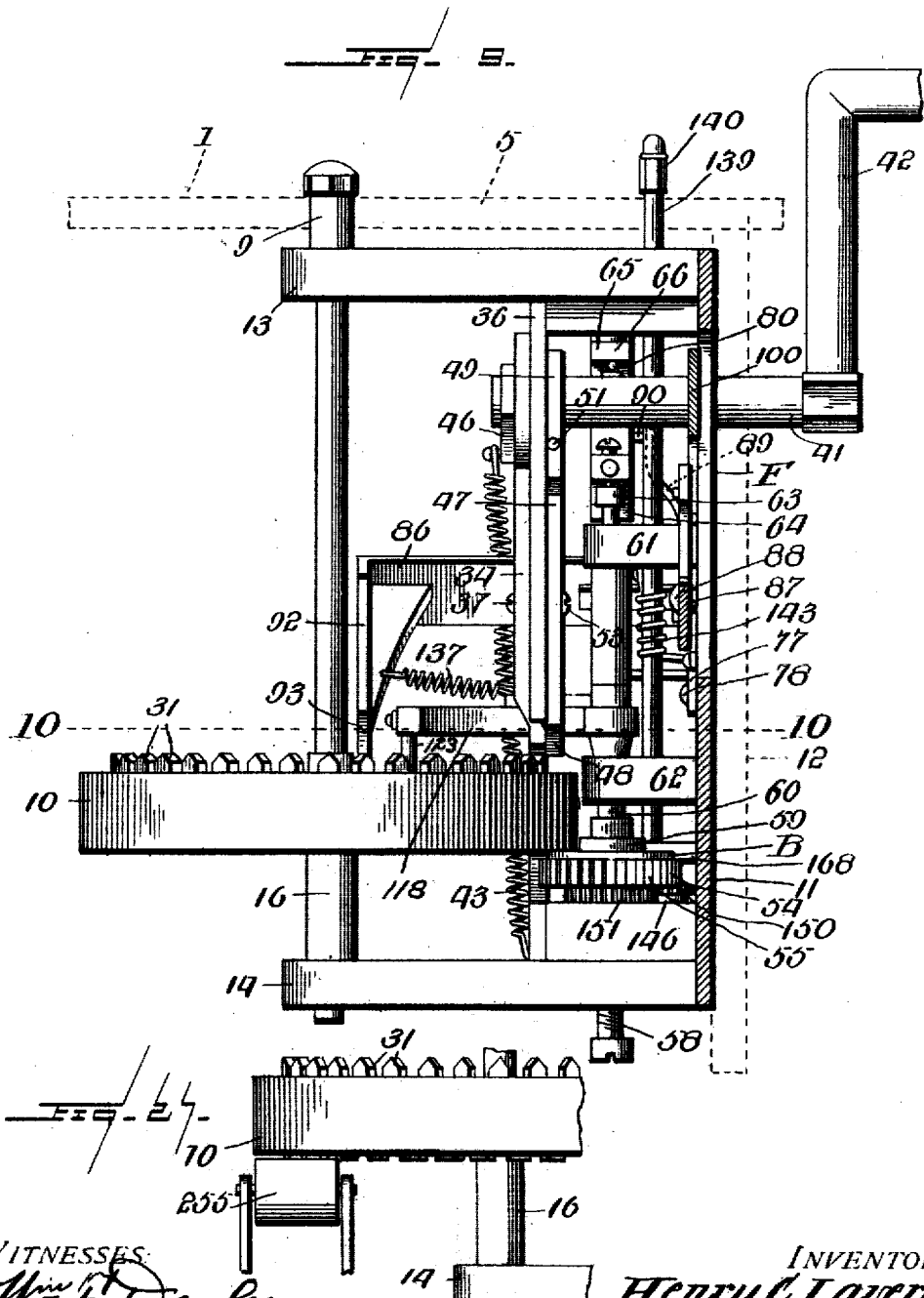

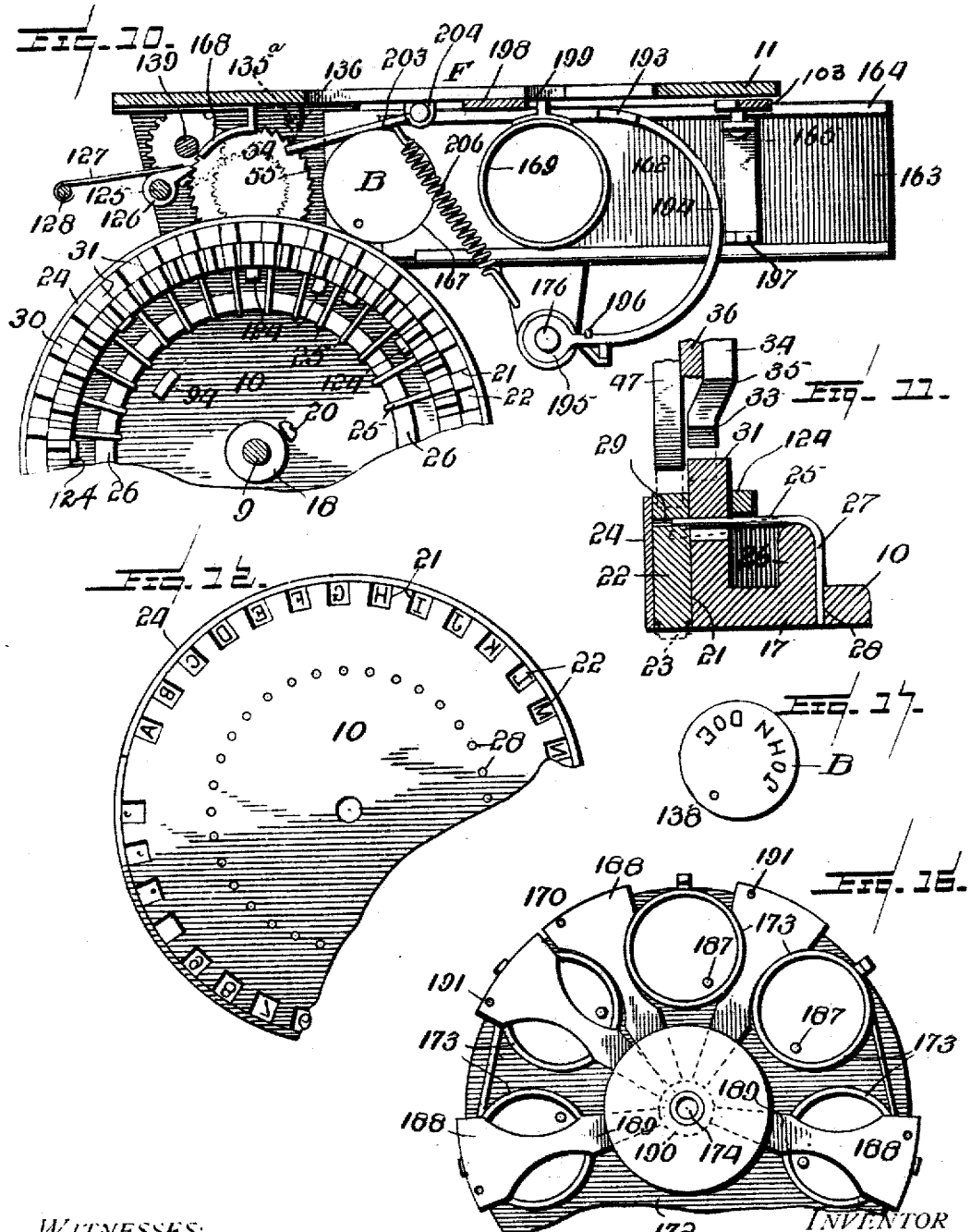

No. 811,783. PATENTED FEB. 6, 1906.
H. C. LAVERY.
STAMPING PRESS.
APPLICATION FILED DEC. 12, 1902.
12 SHEETS—SHEET 11.
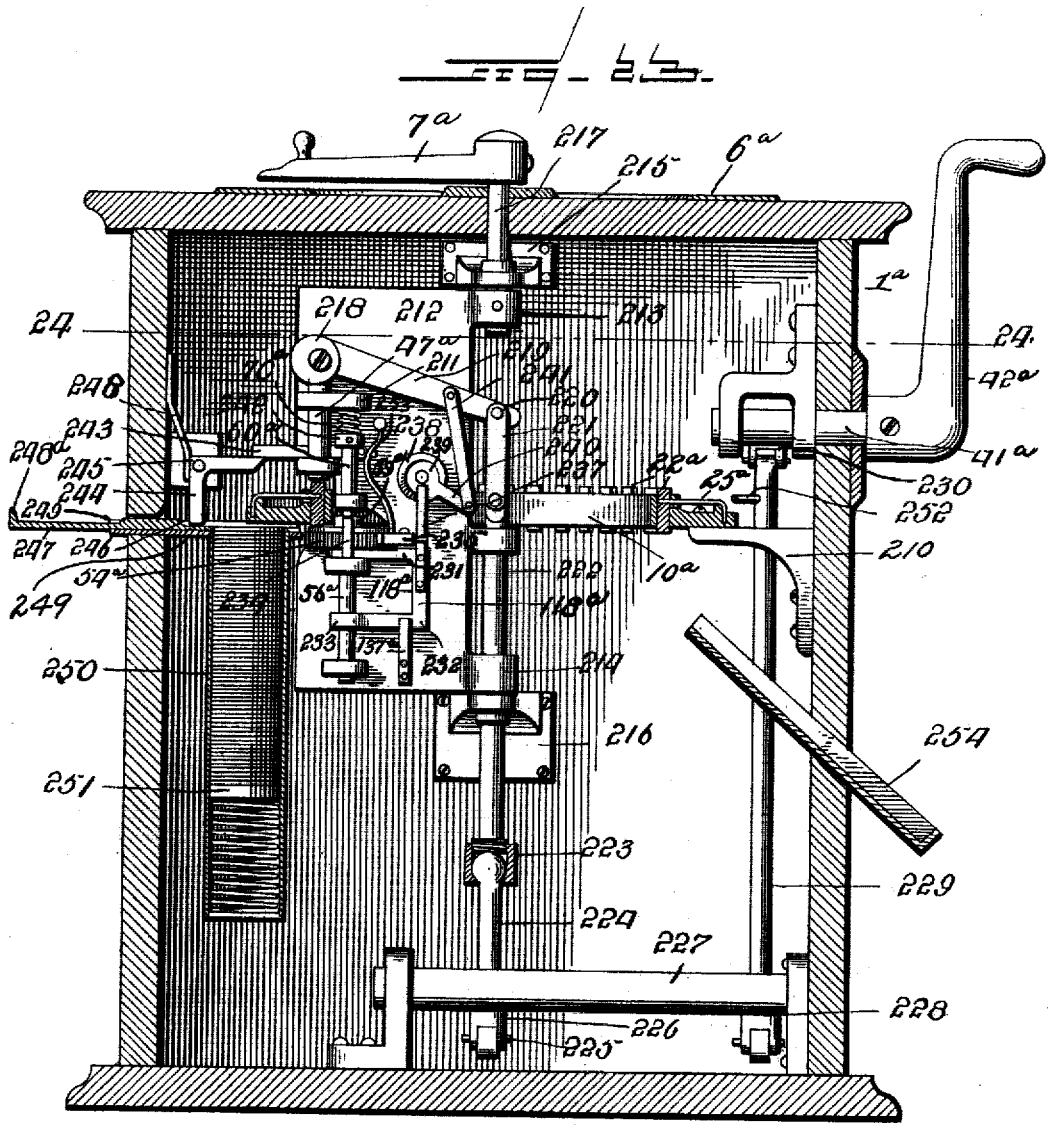
WITNESSES:
Wm F. Doyle.
G. S. Roy.
INVENTOR
Henry C. Lavery.
By D. P. Wolhaupter
Attorney

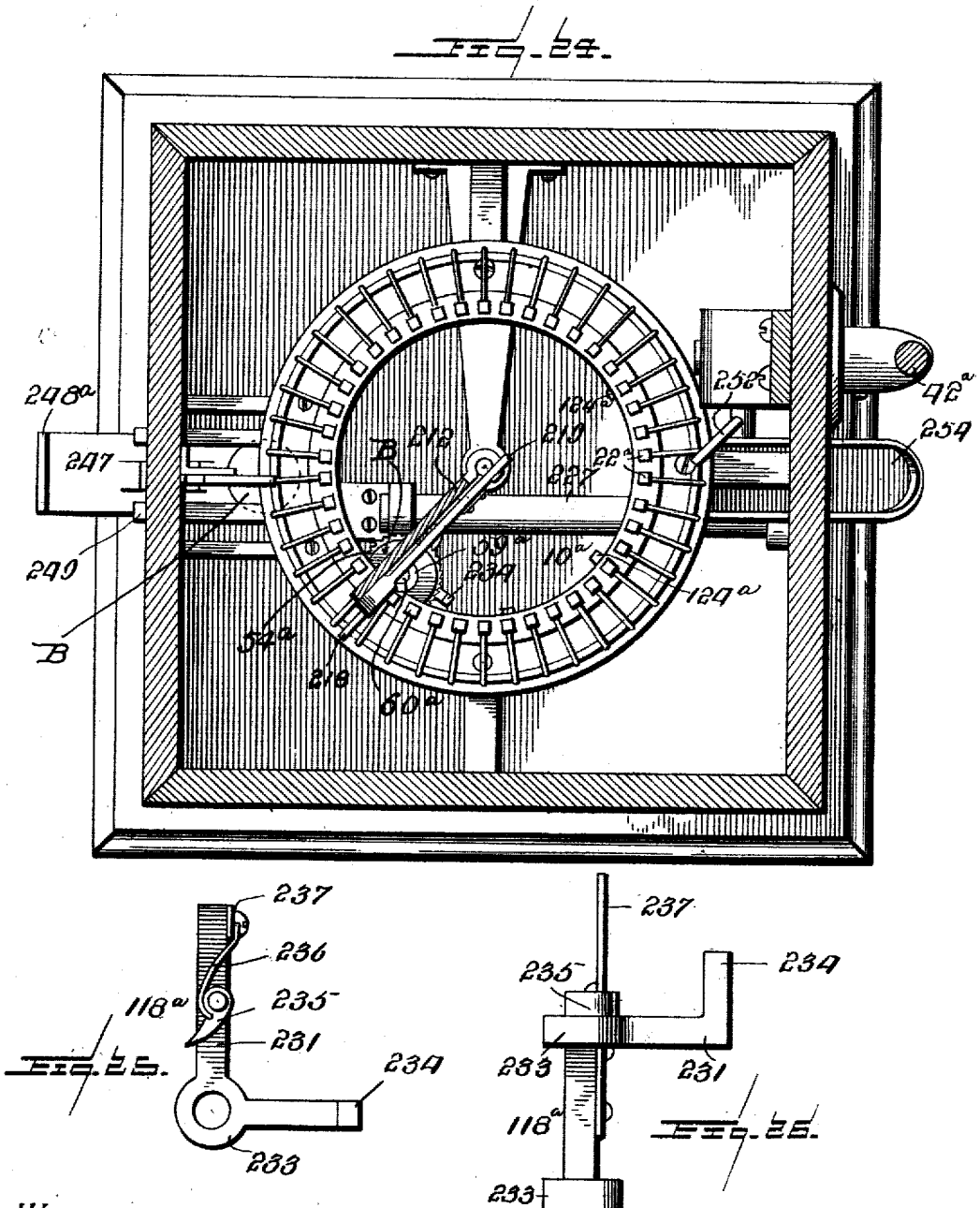

UNITED STATES PATENT OFFICE.

HENRY C. LAVERY, OF WEST SUPERIOR, WISCONSIN, ASSIGNOR TO MILLS NOVELTY COMPANY, OF CHICAGO, ILLINOIS.

STAMPING-PRESS.

No. 811,783.

Specification of Letters Patent.

Patented Feb. 6, 1906.

Application filed December 12, 1902. Serial No. 134,928.

*To all whom it may concern:*

Be it known that I, HENRY C. LAVERY, a citizen of the United States, residing at West Superior, in the county of Douglas and State of Wisconsin, have invented certain new and useful Improvements in Stamping-Presses, of which the following is a specification.

This invention relates to printing, and particularly to an improved machine designed for printing or stamping characters or letters on a blank for any purpose desired.

A special object of the invention is to provide a stamping or printing machine particularly adapted for operating upon a metal blank in the form of a disk and comprising means for placing thereon letters and other characters in the printing or stamping of any matter that may be selected by the operator of the machine. In this aspect the invention possesses special utility as a stamping or printing machine of the check or coin controlled type wherein upon suitable prepayment of a check or coin of proper value a person can operate the machine to stamp upon a blank metal disk his full name and address and have delivered to him the completely-stamped article. Such articles are ordinarily found useful as identification tags or checks for attachment to a key-ring, valise, trunk, or employed for other analogous purposes.

A distinctive feature of the invention resides in a stamping or printing machine of the character indicated which embodies mechanism providing for perfect letter and word spacing the printing in a circle upon a flat surface, such as presented by a blank metallic disk or tag, thereby distinguishing the machine from that class in which a continuous metal tape or ribbon is designed to have characters impressed thereon in a rectilineal line and which tape or ribbon is cut up into lengths according to the requirement.

As a general object the invention has in view a novel construction and arrangement of instrumentalities providing for a positive and reliable operation in the carrying out of every step in the handling of a blank disk upon which a selected name or other matter is to be stamped or printed and then deliver it to the operator.

As a general object the invention also has in view a form of machine which will only become effective for printing or stamping a blank and delivering the same when suitable prepayment has been made through the introduction of a check or coin of proper value.

With these and many other objects in view, which will more readily appear as the nature of the invention is better understood, the same consists in the novel construction, combination, and arrangement of parts, which will hereinafter be more fully described, illustrated, and claimed.

The essential and fundamental features of the invention—namely, that of stamping or printing in a circle upon a blank and carrying out perfect letter and word spacing during such operation—are necessarily susceptible to a variety of modifications without departing from the spirit or scope of the invention. However, preferred embodiments of the machine are shown in the accompanying drawings, in which—

Figure 1 is a general perspective view of a stamping-press embodying the improvements contemplated by the present invention. Fig. 2 is an elevation of the entire stamping or printing mechanism removed from the casing or cabinet and illustrating the various parts in normal positions. Fig. 3 is a vertical sectional view of the stamping or printing mechanism, the line of section including the axes of the die-holder and the current-storage magazine for the blank disks. Fig. 4 is a similar view, the line of section being in closer proximity to the base of the supporting-frame and exposing the parts in the positions which they occupy after the transfer of a blank disk onto the anvil and its clamping thereon through the medium of the holding device or presser-clamp. Fig. 5 is a vertical sectional view of the machine at one side of the plane of the holding device for clamping the blank disk upon the anvil. Fig. 6 is a sectional view intersecting the longitudinal plane of the holding device for the blank disk and indicating the various instrumentalities in the position which they assume when the indicator for positioning the dies or type points to the word "Start" on the character-dial. Fig. 7 is a view similar to Fig. 6 with the parts in positions permitting of the stamping or printing operation. Fig. 8 is a vertical sectional view taken through the storage-magazine on the line 8 8 of Fig. 3. Fig. 9 is a transverse sectional view on the line 9 9 of Fig. 2, the line of section omitting the storage-magazine and its related parts. Fig. 10 is a detail sectional view immediately above the plane of the die-holder and the parts immediately associated therewith, substantially on the line 10 10 of Fig. 9. Fig. 11 is a detail sectional view showing more plainly the operative relation of the die-actuator, the setting and registering pawl, and the elements of the die-holder with which they coöperate. Fig. 12 is a bottom plan view of a portion of the type-wheel form of die-holder. Figs. 13 and 14 are detail views, respectively, of the combined setting and registering dog and the die-actuator for the individual die or type elements. Fig. 15 is a detail plan view of the pawl-carrier of the spacing mechanism for the blank anvil or rest. Fig. 16 is a bottom plan view of a portion of the storage-magazine. Fig. 17 is a detail view of the form of blank disk which is handled by the machine. Fig. 18 is a detail sectional view on the line 18 18 of Fig. 5, showing the locking device for the shaft of the auxiliary blank-setting device. Fig. 19 is a detail plan view of the ratchet-adjusting wheel of the auxiliary blank-setting device. Fig. 20 is a detail bottom plan view of the setting-gear of the auxiliary blank-setting device. Fig. 21 is a detail sectional view of the releasable clutch connection, the line of section being indicated by the line 21 21 of Fig. 4. Fig. 22 is a detail plan view of the latch for the storage-magazine. Fig. 23 is a vertical sectional view of a modification involving the employment of a stationary die-holder. Fig. 24 is a cross-sectional view of the same construction on the line 24 24 of Fig. 23. Figs. 25 and 26 are detail views of the swinging pawl-carrier associated with the construction shown in Fig. 23. Fig. 27 is a detail view showing an inking device for the type.

Like reference characters designate corresponding parts throughout the several figures of the drawings.

The various instrumentalities forming related parts of the complete stamping or printing mechanism may be housed within any suitable form of cabinet or casing and also may or may not be controlled through the medium of a check or coin of proper value, which serves to place the mechanism of the machine in such condition that it may be operated by the person desiring to obtain a disk or check with a name and address or other character-printed matter thereon. Inasmuch as the stamping or printing mechanism possesses special utility in connection with means controllable by a check or coin of proper value for setting the machine in condition for operation, reference will be made thereto particularly in the aspect of a vending or coin-controlled machine, although it will be understood that the stamping or printing mechanism is necessarily available for use generally in the printing or stamping of characters in a circular line upon a flat surface—such, for instance, as a blank disk, tag, or check, usually of metal form, so as to be useful as an identification-tag, such as employed on key-rings and the like.

For illustrative purposes the stamping or printing mechanism and the instrumentalities coöperating therewith are shown in the drawings as conveniently housed within an upright inclosing cabinet or casing 1, provided at a convenient point with a coin-slot 2 for the introduction of a coin of proper value, and also with an exterior delivery cup or tray 3, offset from one side of the cabinet or casing and in communication with the discharge-slot 4 in such side, and through which is discharged or delivered the completely stamped or printed disk or tag. These details, which constitute a part of the equipment of the cabinet or casing, are associated with parts of the stamping mechanism hereinafter referred to; but at this point it may be noted that in addition to the elements mentioned the inclosing cabinet or casing 1 for the mechanism is designed to bear thereon, preferably upon its inclined cover or top 5, a character-dial 6, held stationary upon the cover or top 5 and preferably in the form of a plate bearing thereon all of the letters of the alphabet, the numerals, punctuation and spacing marks, as well as suitable indications such as "Start," "Space," "Finish," &c., indicating, respectively, positions for starting the mechanism, for spacing purposes alone, and for the finishing operation of releasing the blank disk or tag and discharging the same through the slot 4 into the delivery cup or tray 3. The said character-dial 6 has arranged for play thereover a swinging indicator 7, provided at one extremity with the pointer 8, working over the indications upon the dial, and at its other extremity the said indicator, which is in the form of a swinging arm, is rigidly fastened to the outer and upper extremity of a die-adjusting shaft 9, constituting a part of the mechanism within the cabinet or casing. Hence the swinging indicator 7 not only acts in the capacity of a pointer, but also forms the selecting member of the machine—that is, the member by which the desired character to be printed or stamped is selected by the operator and the shaft 9 correspondingly adjusted to bring into properly-set position the die-holder 10, which is carried by and turns with the shaft 9 in the form of the invention now being described.

The stamping mechanism within the cabinet or casing 1 is carried by the main supporting-frame, designated in its entirety by the letter F and including a base member 11, which is designed to be rigidly fastened to one of the side walls 12 of the cabinet or casing, as plainly illustrated in Fig. 9 of the drawings, to provide for sustaining the mechanism in the most convenient position for operation. Hence for convenience in explaining the action of some of the elements of the mechanism the movement of such elements will be referred to as "forward" or "backward," and vice versa, with reference to the front of the cabinet or casing, assuming the mechanism to be mounted in the position as suggested by Figs. 1 and 9 of the drawings.

The base member 11 of the main supporting-frame F is provided with various auxiliary supporting and bearing members for sustaining, guiding, and journaling different parts of the mechanism and which will be separately referred to in connection with the parts associated therewith.

In the mounting of the die-adjusting shaft 9 the supporting-frame F has projected from one side thereof and respectively at its upper and lower ends the offstanding bearing-arms 13 and 14, provided therein with bearing-openings 15 for receiving the end portions of the shaft 9, and the latter may be conveniently held against displacement from its bearings through the medium of a supporting sleeve 16, fitted on the lower portion thereof above the lower bearing-arm 14, as may be plainly seen by reference to Figs. 3 and 9 of the drawings. In the form of machine being described the die-holder 10 is also preferably fitted to the shaft 9 above the supporting-sleeve 16 and turns with the shaft in order to bring the individual die or type elements into proper position for stamping or impressing their characters upon the disk or tag being operated upon. The said die-holder 10 is designed to carry a plurality of individual die or type elements corresponding to the characters upon the dial 6 and separately and individually operable. To provide for bringing the separate characters of the individual die or type elements into a stamping or printing position, it is necessary to have a relative shifting movement in a circular plane between the die-holder and the blank to be operated upon. Either may therefore be shifted to positions for bringing the individual die or type elements into play; but in the illustrated form of machine now being described the die-holder 10 is in the form of a die-wheel having a body portion 17, provided with a central hub 18, held fast to the shaft 9 through the medium of a screw 20 or equivalent fastening device. The wheel-body 17 is further provided at the peripheral edge thereof with a continuous circular series of die-sockets 21, arranged in spaced relation and each accommodating therein a plunger-die or type element 22, usually in the form of a type-bar having the die or type-face 23 at the lower end thereof, which is designed to be pressed onto the disk or tag. The die-sockets 21, arranged about the periphery of the wheel-body 17, as plainly shown in Figs. 10, 11, and 12 of the drawings, extend entirely through the body of the wheel transversely in order to give full and free movement for the die or type elements, and in the construction shown the sockets 21 are formed directly in the peripheral edge of the wheel-body and are designed to be closed in at their outer sides through the medium of a retaining-band 24, encircling the periphery of the wheel-body and holding the individual die or type elements in operative position. The removal of the band 24 permits of the ready removal and replacing of any of the die or type elements should this be necessary.

The plunger-die or type elements 22 are designed to be normally held and retracted within their individual sockets 21 through the medium of the die-holding springs 25. One of the springs 25 is associated with each of the die or type elements 22 and is connected thereto in any suitable manner to secure the result stated. A practical construction, however, is shown, and consists in the employment of holding-springs 25 of angled form, each being bent over and resting upon an annular fulcrum-flange 26, projected from the upper side of the wheel-body 17, inside of the plane of the outer peripheral flange. The pendent arm 27 of each spring is rigidly fastened to the wheel-body, as at 28, while the outer extremity of the yielding arm 28 of the spring is loosely engaged, as at 29, with the type or die element 22 associated therewith, as may be plainly seen from Fig. 1 of the drawings. The arm 28 has sufficient play to permit of the downward thrust of the die or type element and also for a complete retraction of the latter after pressure is removed therefrom.

Another feature of the wheel form of die-holder 10 is the provision of the body 17 at the periphery thereof with an upstanding circular centering-rack 30, consisting of a series of regularly-spaced teeth 31, having beveled upper extremities 32, designed to be engaged by the correspondingly-beveled engaging point 33 of the reciprocatory combined setting and registering dog 34. The reciprocatory setting and registering dog 34, in addition to the beveled engaging point 33, coöperating with the teeth of the rack 30, is provided at one edge, contiguous to the point 33, with a beveled contact-shoulder 35, constituting a tappet member for operating the spacing mechanism in the manner to be presently described for the purpose of effecting the proper character and word spacing during the stamping or printing operation. The said setting and registering dog 34 is held for movement upon one side of an upright frame guide member 36, fitted within the frame in an upright position at one side of and in spaced relation to the base member 11 thereof, being guided for fixed reciprocation upon said frame member 36, through the medium of the retaining stud or screw 37, secured in the frame member 36 and extending through the guiding-slot 38, formed longitudinally in an intermediate portion of the dog 34, which is preferably in the form of a bar. The bar constituting the dog 34 is provided with the end opposite its lower engaging point 33 with an eccentric slot 39, or "cam-opening," as it might be termed, said eccentric slot or cam-opening 39 being designed to receive therein a rocker projection or tappet 40, projected laterally from the inner end portion of the main working shaft 41. This main working shaft 41 in the construction being described is preferably in the form of a rock-shaft arranged horizontally and journaled in suitable bearings in the spaced frame members 11 and 36. The outer end portion of the said main working shaft 41 extends through the side 12 of the casing upon which the mechanism is supported and has fitted to its exposed extremity the exterior operating crank-handle 42, which is manipulated by the operator during the stamping or printing operation. The said main working rock-shaft 41 is normally held and returned to its inactive position, with the handle raised, through the medium of the readjusting-spring 43, secured at one end to a fixed point of attachment upon the frame, as at 44, and connected at its other end, as at 45, with the swinging portion of a rock-arm 46, fitted fast upon the inner extremity of the shaft 41, whereby said shaft when released from the pressure of the operator exerted upon the handle 42 will respond to the retracting or readjusting influence of the spring 43 and automatically resume a normal position.

In connection with the movement of the reciprocating combined setting and registering dog 34 it is to be observed that the eccentric slot 39 in the upper end thereof is formed with a short cam-bearing section 46ª, which is engaged by the rocker projection or tappet 40 on the downward movement of the latter, and by reason of the position and extent of the said bearing-section 46ª the dog 34 has imparted thereto a quick downward thrust when the main working shaft first begins to rock and then remains stationary in its depressed position during the remainder of the downward movement of the operating-handle.

There is associated with the same frame member 36 which provides for the guided support of the combined setting and registering dog 34 a reciprocatory die-actuator 47. This die-actuator 47 is arranged upon the side of the frame member 36 opposite the dog 34, whereby it may be held in position for being operated against the upper ends of the plunger-die or type elements 22 of the die-holder. The die-actuator is preferably in the form of a plunger-bar provided at its lower end with an engaging head 48 for contact with the die or type elements, and at its upper end the bar constituting the actuator 47 is preferably formed with a split collar-section 49, constituting an eccentric-strap and adapted to be loosely clasped upon an eccentric neck or groove 50, provided in the main working shaft 41 at one side of the plane of the rocker projection or tappet 40, which operates to actuate the setting and registering dog 34. The split collar-section 49 may be conveniently held in position upon the eccentric portion of the working shaft through the medium of a fastening-screw 51 or equivalent device, and at a point intermediate its ends the die-actuating plunger is provided with a guiding-slot 52, receiving a retaining stud or screw 53, fitted to the frame member 36, lying between the said plunger 47 and the dog 34. By reason of the eccentric fitting of the die-actuating plunger 47 to the working shaft 41 a rocking of such shaft provides for first moving the dog 34 into active position with reference to the rack 30 and then following such movement immediately by the downward thrust of the actuating-plunger 47 against the upper end of the individual die or type element 22, lying thereunder, whereby the active face 23 of such element will be moved against the blank-disk B, held upon a blank-support 54.

In all embodiments of the invention the die-holder 10 must project into or overlap the plane of the support 54, upon which the blank rests during the stamping or printing operation, and in the form of machine being described the type-wheel form of die-holder projects at one edge over the edge of the support 54, so that the individual die or type elements may be brought into a correct stamping position over the blank upon the support 54, adjacent to the edge of the latter. This relative overlapping relation of the die-holder and the blank-support 54 is plainly shown in Fig. 10 of the drawings, and referring more particularly to the construction illustrated the blank-support 54 consists of a rotatable anvil in the form of a ratchet-wheel having the peripheral ratchet-teeth 55 arranged a character-space distance apart to permit of the proper letter and word spacing in the stamping operation. The said rotatable anvil or ratchet-wheel is mounted on the upper extremity of a pivot-axle 56, so as to leave the top face of the anvil perfectly flat for the support of the blank-disk. The pivot-axle 56 is journaled in a bearing-block 57, projected from one side of the base member 11 of the frame, and the lower end of the axle is supported upon the adjustable thrust-screw 58, mounted in a threaded opening at the under side of the block 57 and serving not only as a thrust-bearing for the rotatable anvil, but also to correct by adjustment any inaccuracy of position it may assume with reference to the feed for the blank-disk and the mechanism for effecting a letter and word spacing.

A single blank-disk B is designed to be held firmly upon the upper face of the rotatable anvil 54 during the stamping or printing operation through the medium of suitable holding means, and to secure this result there is associated with the anvil 54 a blank-holding device. This blank-holding device includes in its general organization a holding-clamp 59 in the form of a presser-foot arranged above the anvil 54 and mounted upon the lower extremity of a reciprocatory and rotatable clamping-spindle 60, loosely working in a pair of spaced upper and lower guide-bearings 61 and 62, projected from one side of the base member 11 of the frame, and at its upper extremity the said clamping-spindle 60 is provided with a shouldered bearing-head 63, having a loosely-interlocked connection with the coupling-fork 64, provided at the lower end of an open clamp-carrying bracket 65. This open clamp-carrying bracket 65 is of an arched form, so as to extend at one side of and about the main working shaft 41, and is provided with an upper pressure-arm 66, disposed above the shaft 41 and having a projecting stud 67, extending into the spring-socket 68, provided in a top abutment 69, constituting a part of the upper frame structure of the machine. The said spring-socket 68 houses therein a pressure-spring or equivalent device 70, which exerts its pressure downwardly upon the upper arm 66 of the bracket 65, and hence serves to normally press the holding device in a downward direction, whereby the presser-foot 59 may be firmly clamped upon the blank-disk B during the stamping or printing operation. The shouldered bearing-head 63, which is loosely coupled or interlocked with the fork 64 of the bracket 65, is held in operative relation to said bracket, while at the same time being permitted to have a free bearing for rotation at such point through the medium of a terminal bearing-screw 71, whose lower pointed end 72 engages in a bearing-notch 73, provided in the end of the head 63. After being properly adjusted with reference to the head of the spindle 60 the bearing-screw 71 is held fast through the medium of a lock-screw 74, mounted in a threaded opening in the lower arm member 75 of the bracket 65 and impinging against the screw 71.

In connection with the holding device for the blank, including the presser-foot 59, the clamping-spindle 60, and the clamp-carrying bracket 65, provision is made for raising the clamp or presser-foot off from the anvil to permit of the positioning of a blank disk upon the anvil and also for the discharge of the disk after the stamping operation is finished and at the same time to provide for maintaining the clamp or presser-foot in binding or holding engagement with the blank during the entire period that the machine is operating thereon. This is accomplished through the instrumentality of a controlling mechanism for the blank-holding device just described. This controlling mechanism primarily includes as an essential element thereof a clutch member 76 in the form of an upright swinging lever provided at its lower end with an angled supporting-arm 77, having a pivotal support at its terminal, as at 78, upon the inner side of the base member 11 of the frame, as plainly shown in Figs. 6 and 9 of the drawings. At its upper extremity the swinging lever, constituting the clutch member 76, is provided with a collar or equivalent element 79, which provides for rigidly holding to the swinging end of the lever a clutch rod or finger 80, extending through the receiving-opening 81, provided in the main upright portion of the clamp-carrying bracket 65 and adapted to be projected into and to be withdrawn from the interval lying between the main working shaft 41 and the upper pressure-arm 66 of the bracket 65 and when projecting into said interval being designed to be engaged by the contact end of the lifting-cam or cam-tappet 82, fitted to and projecting from the surface of the working shaft 41. When the clutch rod or finger 80 is withdrawn from the interval between the shaft 41 and the upper pressure-arm 66 of the bracket, the bracket is free to be pressed downward by the pressure spring or device 70 for clamping the presser-foot upon the blank disk and will remain in this position, inasmuch as the lifting-cam 82 will clear the arm 66 of the bracket when the clutch rod or finger 80 is withdrawn. The supporting part 77 of the clutch member 76 is normally swung upward, hence holding the rod or finger 80 projected through the opening 81 and within the interval immediately above the shaft 41, through the medium of a clutch-adjusting spring 83, secured at one end, as at 84, to the lower part 77 of the clutch member 76 and connected at its other and upper end, as at 85, to the angled bracket member 86 of the clutch-shifter 87. The clutch-shifter 87 is in the form of an oscillatory lever extending along one side of the base member 11 of the supporting-frame and pivotally mounted adjacent to its rear end (with reference to the front of the cabinet or casing) upon a pivot 88, fitted to the base member of the frame. Adjacent to the plane of its pivotal support 88 the oscillating lever 87, constituting the clutch-shifter, is provided with an upstanding release-arm 89, carrying at or adjacent to its upper end an adjusting pin or stud 90, engaging with a guiding-notch 91, provided in one edge of the upstanding arm of the lever clutch member 76. In addition to the upstanding release-arm 89 the lever 87 is formed at the rear end with the angled bracket member 86, previously referred to, which angled bracket member is offset away from the plane of the base member 11 of the supporting-frame and is provided with a depending or pendent check-arm 92, having an engaging foot 93 at its extremity, beneath and in front of which passes an arresting-stop 94, projected from the floor of the wheel-body 17 and serving to prevent a swinging movement of the shifter or lever 87 when the indicator 7 is turned to the indication "Finish" upon the character-dial, hence leaving the clutch rod or finger 80 projected into an operative position, so that the holding device or clamp may be raised from the finished blank disk upon the downward movement of the operating-handle.

A retractile operating-spring 95 is connected at its lower end, as at 96, to the lever 87 at a point intermediate the latter and at its upper end, as at 97, to a fixed point of attachment upon the main supporting-frame. This spring 95 serves, when free to do so, to elevate the forward part of the lever 87, and hence swing rearward the upstanding release-arm 89, with the consequence of drawing the adjusting-pin 90 backward against the clutch or lever member 76 and withdrawing the clutch rod or finger 80 to an inoperative position. This action is partly controlled through the medium of a latch-arm 98, projected from the lever 87 and with which coöperates a holding stud or pin 99, carried by the auxiliary motion-transmitting element 100. (See Fig. 5.) The forward end of the lever, constituting the clutch-shifter 87, is provided with an expanded guiding-head 101 for the supplemental holding pin or stud 102, carried by a lever element 103 and designed to sweep over a curved guide-section 104, provided along the front portion of the said lever 87 for a purpose to be presently explained. The lever element 103 constitutes a part of the feeding mechanism for the individual blank disks or tags, as will hereinafter appear, and is designed to derive its motion from the auxiliary motion-transmitting element 100, said elements 100 and 103 being preferably brought into operative connection or relation through the medium of a coin or check of proper value introduced through the coin-slot 2 of the machine cabinet or casing.

In taking up the operative relation between the elements 100 and 103 it is first to be observed that the said element 100 is in the form of a reciprocatory bar and derives its motion from the main working shaft 41. To provide for imparting the proper reciprocatory movement to the motion-transmitting element 100, the latter is provided in the rear end portion thereof with an eccentric slot 104$^a$, provided with a cam bearing-section 105, adapted to be engaged by the rocker projection or tappet 106, carried by main working shaft 41. The said cam bearing-section 105 (see Fig. 5) of the eccentric slot 104$^a$ is of such inclination with reference to the movement of the rocker projection or tappet 106 that the first movement of the latter when the operating-handle is first pressed upon serves to impart a quick backward motion to the element or bar 100 and then permits the latter to remain stationary during the remainder of the downstroke of the operating-handle.

To provide for transmitting the motion from the element 100 to the lever element 103, constituting a part of the blank-feeding mechanism hereinafter described, the front end portion of the element or bar 100 is provided with a longitudinally-disposed play-slot 107, adapted when the coin or check is not in the machine to loosely slide over the coupling stud or projection 108, projected from one side of the feed-lever element 103, which feed-lever element is pivotally supported at its upper end upon the base member of the frame by the supporting-pivot 109, thus leaving the lower end of the lever free for blank-feeding purposes. Adjacent to the upper edge of the front slotted end of the element or bar 100 the lever 103 also has projected from the same side as the stud or pin 108 an auxiliary locking stud or pin 110, which coöperates with a keeper-notch 111, formed in the upper edge of the element or bar 100. Immediately below the lower edge of the element or bar 100, at the slotted end thereof, the feed-lever element 103 has fitted thereto and offset therefrom a rest-block 112, having a grooved upper end 113, constituting a seat which receives the lower edge of the element or bar 100, as well as the coin when the same is introduced through the slot 2 and passes into the coin-holder 113$^a$, which is rigidly fitted to and carried with the front end portion of the element or bar 100. The coin-holder 113$^a$ essentially consists of an upright plate member 114, secured upon the slotted end of the element or bar 100 through the medium of the fastening-screws or equivalent devices 115 and also includes a short open-ended chute-section 116, carried by the plate member 114 and having a stud-opening 117 in one edge thereof to not only permit of the play of the bar 100 over the stud 108, but also to expose the latter within the chute-section 116 in order that a coin when introduced into such chute-section will fall to the bottom thereof and be held by the rest-block 112 in a coupling position between the stud 108 and the directly opposite side or edge of the coin-chute, as plainly shown in Figs. 5 and 21 of the drawings. In such position of the coin the same acts as a coupling medium in connection with the stud 108 between the elements 100 and 103, so that in setting the apparatus for feeding a blank into position and starting the stamping operation the coin will cause the said elements 100 and 103 to move in unison.

Referring more particularly to the action of the blank-holding device and the controlling mechanism for such device under different conditions, it is to be observed that the parts normally occupy the positions shown in Fig. 5 of the drawings, wherein the presser clamp or foot 59 is raised slightly above the anvil, but not a sufficient distance to admit of the positioning of a blank disk thereunder. In this position of parts it will be observed that the motion-transmitting element 100 is thrust in its forward position with the holding stud or pin 99 engaged against the latch-arm 98, thus tilting the release-arm 89 with its adjusting-pin 90 away from the clutch member 76, so that the latter, under the influence of its adjusting-spring 83, will hold the clutch rod or finger 80 in interfering relation to the lifting-cam 82 of the main working shaft 41. Fig. 6 shows a position wherein the presser foot or clamp 59 is raised sufficiently above the anvil to receive thereunder or release a blank disk; but said foot or clamp only remains in such position during the partial rocking of the shaft 41 when there is a coin in the slot or when the indicator points to the word "Finish" upon the dial. Referring again to the initial position of parts, it will be observed that the rod or finger 80 is adjusted to such position that when the main working shaft has been rocked sufficiently to provide for the positioning of a blank disk on the anvil the cam 82 will move off the end of the rod or finger 80, and thereby allow the presser-foot to clamp the blank disk on the anvil while the said disk is still held in position by the transferrer-slide 162, hereinafter referred to, and when the mechanism is being returned to normal positions the cam 82 engages against the end of the rod or finger 80, moving the latter backward a sufficient distance to allow the cam 82 to clear and pass under the rod or finger without disturbing the clamped position of the presser-foot upon the disk. When a coin is dropped through the slot 2, the same passes into the chute of the coin-holder 113ª, carried by the motion-transmitting element 100 and falls to the position shown in Fig. 5, wherein it rests upon the rest-block 112, so as to lie in a coupling position between the coupling-stud 108 and the opposite edge or side of the coin-chute. A downward movement upon the exterior operating crank-handle 42 with the coin in the position indicated will carry the rocker projection or tappet 106 of the main working shaft around within the eccentric slot 104ª of the bar or element 100 and against the cam bearing-section 105 of such slot, thereby serving to move the bar or element 100 in a backward direction and simultaneously swing the lever element 103 also backward to effect the feeding in of a blank disk beneath the presser-foot in the manner hereinafter explained. This operation takes place after the swinging indicator 7 has been turned to the starting position, indicated by the word "Start" upon the character-dial, and is the first step which provides for placing a blank disk upon the anvil ready to be operated upon. After effecting this result the pressure on the operating-handle is released, and the parts are returned to normal position under the retracting influence of the readjusting-spring 43 for the main working shaft. It is to be observed, however, that in the initial operation when the bar or element 100 is drawn backward the swinging movement of the lever element 103 carries the rest-block 112 beneath and against the lower end of the slotted end of the bar 100, so that the keeper-notch 111 thereof will be carried into engagement with the auxiliary locking-stud 110, thus releasing the pressure off the coin and permitting the latter to fall out of the chute and into any suitable receptacle that may be arranged within the cabinet or casing 1 for the reception thereof. The temporary interlocked connection 110 111 between the elements 100 and 103 is maintained until the initial movement (indicated in Fig. 6 of the drawings) is completed by the transfer or positioning of a blank disk upon the anvil. Also in this initial or starting operation, inasmuch as the holding stud or pin 99 in the first instance presses against the latch-arm 98 of the clutch-shifter 87, the supplemental holding pin or stud 102 passes onto the curved guide-section 104 at the upper edge of the clutch shifter or lever 87, and therefore serves to maintain such clutch shifter or lever in an inactive position while the main holding stud or pin 99 moves away from the latch-arm 98. This is necessary in order to permit the clutch rod or finger 80 to remain in an active or operative position with reference to the lifting-cam 82. Upon the restoration of the parts to normal positions under the influence of the readjusting-spring 43, as previously referred to, the feed-lever element 103 necessarily swings to its extreme forward position, which provides for the keeper-notch dropping out of engagement with the locking-stud 110, thereby uncoupling the motion-transmitting element or bar 100 from the lever 103 and leaving the said lever element 103 and the associated parts of the blank-feeding mechanism idle during the remaining operations of the machine—namely, in the stamping or printing of the disk and the discharge thereof by the finishing step, which is indicated by the movement of the pointer 7 to the indication "Finish" on the character-dial. The uncoupled relation of the bar 100 and the lever 103 is shown in Fig. 7 of the drawings with the bar 100 moved rearwardly, as occurs during the printing operation. Under such movement of the bar with the lever 103 idle the main holding-stud 99, carried by the bar or element 100, passes away from the latch-arm 98, thus leaving the same free to be acted upon by the operating-spring 95, which provides for tilting the shifter or lever 87 in a direction for moving the clutch member 76, with its clutch rod or finger 80, to an inactive position. Hence it will be understood that when there is no coin in the coin-holder to provide for coupling the motion-transmitting element 100 with the feed-lever element 103 and the indicator 7 is pointing to any other character on the dial excepting the indication "Finish" and the working shaft is rocked the clutch-shifter 87 and the clutch member 76 take the position shown in Fig. 7 of the drawings. As previously explained, when the stamping is completed and the indicator 7 turned to the indication "Finish" the arresting-stop 94 is brought into interfering position with relation to the check-arm 92 of the clutch-shifter 87, thereby preventing movement of the latter that would provide for the withdrawal of the clutch rod or finger to an inactive position.

With an understanding as to the manner in which the blank disk is clamped upon and released from the rotatable anvil 54 it is now to be observed in the form of machine being described that it is necessary to impart to said anvil a step-by-step movement to provide for the necessary letter and word spacing. This may be accomplished through the instrumentality of a suitable spacing mechanism, a preferable form of which is shown in the drawings. This spacing mechanism includes in its general organization an oscillatory pawl-carrier 118 in the form of a swinging frame having a main carrying-arm 119, provided at one end with a pivot-collar 120, loosely journaled or mounted upon the clamping-spindle 60 and held in operative position thereon through the medium of a spacing-sleeve 121, fitted on the spindle and introduced between the collar 120 and the under side of the upper guide-bearing 61 for the spindle. The said main carrying-arm 119 for the pawl-carrier is provided at its outer end with a segmental elbow 122, carrying at its extremity a pendent arresting projection 123, extending into the type-wheel 10 and having a movement toward and from the inner periphery thereof and adapted to contact with the stops or stop-lugs 124 of variable projection from the inner side of the peripheral flange of the wheel-body. The stops 124 of the greater width or projection necessarily provide for a less degree of movement for the pawl-carrier 118 than the stops or stop-lugs 124 of least projection, hence providing means for varying the play of the pawl-carrier 118, according to the width of the letters or characters selected. Some of the letters or characters are narrower than others, and hence by reason of the construction and arrangement of parts described provision is made for insuring a uniform spacing between the letters or characters which are being stamped upon the blank disk. The main carrying-arm 119 of the pawl-carrier 118 is further provided with a pendent supporting-post 125, upon the lower end of which is pivotally mounted a plurality of spacing-pawls 126, the points of which pawls engage the peripheral ratchet-teeth 55 of the rotatable anvil 54 and are yieldingly held in operative relation to said teeth through the medium of the pressure-springs 127, made fast at one end to the pawls 126 and whose outer free ends are arranged to bear against a holding-bar 128, carried by and projecting from the main carrying-arm 119 of the pawl-carrier 118. To provide for an effective oscillation or movement of the pawl-carrier 118 there is associated therewith an operating-lever 129 in the form of a bell-crank pivotally mounted at its angle, as at 130, upon the upper side of the carrying-frame 119 contiguous to the pivot-collar 120. The short arm 131 of the said lever constitutes an advancing member projecting through an opening 132 in the frame of the guide member 36 and lying in the path of the contact shoulder or tappet member 35 of the combined setting and registering dog 34. The other long arm 133 of the said operating-lever 129 is held in yielding contact with a stop projection 134 upon the pawl-carrier through the medium of a yielding connector 135 in the form of a spring connected at one end to the outer extremity of the bell-crank arm 133 and at its other end to the elbow member of the pawl-carrier. The said yielding connector 135 provides a direct connection between the pawl-carrier and the operating-lever 129 therefor, so that when the contact-shoulder 35 of the dog 34 moves against the short arm or finger 131 the yieldingly-mounted lever 129 will transmit the motion thus derived to the pawl-carrier, and hence to the pawl or pawls 126, thus turning the anvil the proper spacing distance. However, the yielding connector 135 permits of a sufficient independent movement of the parts whereby the operating-lever 129 is permitted to make a full stroke each time, while the pawl-carrier will make a variable stroke, according to the width of the character being printed, and hence according to the movement of the pendent arresting projection 123 against the coöperating elements of the type-wheel. Backward movement of the rotatable anvil is prevented through the medium of a suitably-mounted check-pawl 135$^a$, normally held in engagement with the ratchet-teeth of the anvil through the medium of an adjacent pressure-spring 136, and the pawl-carrier 118 is restored to a normal position after each advance thereof through the medium of a retracting-spring 137, connected at one end with the pawl-carrier or any of its attached parts and at its other end to a point of attachment upon the angled bracket member 86 of the clutch-shifter 87. It will thus be seen that the reciprocatory combined setting and registering dog performs a dual function. First, upon the downward movement or thrust of the said plunger after the individual die or type element 22 has been selected by the adjustment of the indicator 7 over the dial the engaging point 33 thereof passes between the adjacent teeth 31 of the centering-rack 31, and thus serves to bring the die or type element into exact register over the printing-point and directly under the engaging head or end 48 of the die-actuating plunger 47, so that as the plunger 47 in its movement follows the movement of the dog 34 the die or type element will be stamped upon the blank disk in the proper position. Second, the downward thrust of the dog 34 carries the shoulder or tappet member 35 thereof against the advancing member or finger 131 of the pawl-carrier 118 to effect the spacing of the anvil and the blank thereon, so that the latter will receive the stamp or impress of the die or type character at the properly-spaced point.

As shown in Fig. 17 of the drawings, the blank disk B is usually provided near the edge thereof with an eyelet or small aperture 138, by means of which the stamped or printed disk or tag may be strung upon a key-ring or connected with any object desired. The stamped characters are printed in a circle upon the disk near the edge thereof, and ordinarily the disk is placed upon the anvil in such position that the stamping or printing will begin near the eyelet at one side thereof and will continue about the disk to a point near the opposite side of the eyelet. Ordinarily in a machine of the character just described the size of the blank disk is such that a name and address containing about thirty characters can be symmetrically printed about the disk from one side of the eyelet to the other; but under some conditions a short name or other matter of a less number of characters may be desired to be placed upon the disk, and under such conditions it is desirable to provide means for starting the stamping or printing at such a point that the beginning and ending of the matter will be equidistant from opposite sides of the eyelet 138. To secure this result, it is necessary to provide means for adjusting the blank, in the first instance, well upon the anvil to a position for beginning the stamping or printing at a proper distance from the eyelet. While different expedients may be employed for accomplishing this result, a preferred means is shown in the drawings and consists in the employment of an auxiliary blank-setting device. This auxiliary blank-setting device includes an adjusting-shaft 139, journaled in suitable bearings in the supporting-frame and arranged upright therein. The upper end of said adjusting-shaft projects through the top of the cabinet or casing and has fitted thereon a space-indicator 140, whose point 141 is arranged to play over a segmental scale 142, having indications thereon to designate the number of spaces distant from the eyelet or hole 138 of the blank at which it may be desired to start the stamping or printing operation. The shaft 139 is normally turned to position with the space-indicator 141 pointing to the greatest number of spaces that it is possible to print through the medium of a return-spring 143, coiled upon the shaft at a point intermediate its ends, one end of said spring being secured to the shaft, as at 144, and the other end secured to a fixed point of attachment, as at 145, upon the base member of the supporting-frame. At or near the lower end of the shaft 139 and below the plane of the rotatable anvil 54 the adjusting-shaft 139 of the auxiliary blank-setting device has mounted fast thereon an adjusting-wheel 146, provided on the upper side thereof with a series of ratchet-teeth 147, whose shoulders are adapted to be engaged by the free end of a spring-pawl 148, secured fast at one end, as at 149, to the lower face of a setting-gear 150, loosely mounted on the shaft 139 above the wheel 146 and meshing with a gear-wheel 151, made fast upon the pivot-axle 56 beneath the blank support or anvil 54, carried by said axle. The movement of the shaft 139 for blank setting or adjusting purposes is in a direction contrary to the feeding movement of the anvil under the influence of the pawls 126, carried by the pawl-carrier 118, and when turned in such direction, as indicated by the arrows in Fig. 10 of the drawings, the shoulder of one of the ratchet-teeth 147 will engage against the end of the spring-pawl 148, thus locking the setting-gear 150 to the adjusting-wheel 146, whereby the motion of the shaft 139 will be transferred to the gear-wheel 151, and hence to the blank-support or anvil 54, to provide for turning the latter a desired distance for starting the stamping or printing upon the blank. During the feeding movement of the anvil under the influence of the pawls carried by the pawl-carrier a reverse motion will be transferred from the gear-wheel 151 to the loose gear 150, whereby the end of the pawl 148 will idly trail over the ratchets or ratchet-teeth 147. When the adjusting-shaft 139 has been set to any desired point in the manner explained, the space-indicator 140 is left at the indication to which it may be turned, and the parts are held in their adjusted position through the medium of a ratchet or notched locking-disk 152, the teeth of which are adapted to be engaged by the catch-pawl 153, carried by one of the oppositely-located end arms 154 and 155, deflected from the bar portion 156 of a pivotal pawl-frame 157. The said pawl-frame 157 has projected from its opposite end arms 154 and 155, the pivot-journals 158, journaled in suitable bearings provided in the upper part of the main supporting-frame for the mechanism, and is normally drawn in a direction for holding the pawl 153 in engagement with the disk 152 through the medium of a pressure-spring 159, connected at one end to the pawl-frame and at the other end to a suitable point of attachment 160 upon the main frame. The end arm 155, opposite the arm carrying the catch-pawl 153, is arranged to be engaged by the beveled lifting-shoulder 161, provided at an upper corner of the clamp-carrying bracket 65. By reason of this operative relation between the bracket 65 and the pawl-carrying frame 157 it will be noted that after the desired matter has been stamped or printed on the disk and the main indicator 7 turned to the indication "Finish" on the dial the exterior operating-handle 42 will be depressed, thereby adjusting the clamp-carrying bracket 65 in the manner previously described, and which movement of the bracket causes the same to lift the pawl-frame 157 out of operative relation to the ratchet-locking disk 155, thereby permitting the return-spring 143 to come into play and return the space-indicator 140 to its normal position. The blank disk is positioned upon the rotatable support or anvil 54 through the medium of a reciprocatory transferrer 162, preferably in the form of a reciprocatory slide working in the guideway 163, fitted in the lower portion of the supporting-frame and lying in substantially the plane of the upper rest or supporting-face of the anvil 54. The said guideway is of a sufficient length to accommodate the full play of the transferrer-slide 162 and is provided at its opposite side edges with the inturned guiding-flanges 164, which are engaged by the opposite longitudinal side edges of the transferrer-slide 162, whereby the same is held to a fixed reciprocation. This reciprocation is positively imparted to the transferrer-slide 162 from the feed-lever element 103, which has the self-releasable clutch connection with the motion-transmitting element 100 through the medium of the coin, as previously described. An operative connection is provided between the lower end of the feed-lever element 103 and one end of the transferrer-slide 162 by means of a stud 165, engaging a slotted attaching-arm 166, projected from one end of the slide. At its rear end, opposite the operative connection with the lower end of the lever element 103, the transferrer-slide 162 is provided with a semicircular or concaved blank-seat 167, (see Fig. 10,) which is adapted to engage about the edge of a blank, whereby the same will be firmly held by the slide until it is transferred from the guideway 163 onto the upper face of the anvil 54 and against the abutment-spring 168, supported in a position over the anvil adjacent to one edge thereof and in line with the transferring movement of the slide 162.

This abutment-spring 168 serves as a guide-stop or arresting medium for the blank when it is placed upon the anvil by the transferrer and prevents it from going beyond its proper centered position upon the anvil. By reason of the flexibility of the abutment, the same being preferably a spring, it adapts itself to any irregularities on the edge of the disk, so that the turning of the latter with the anvil is not interfered with. (See Fig. 10.) The transferrer-slide 162 operates beneath a working magazine 169, preferably in the form of an open cup held in a stationary position above the guideway 163 at an intermediate point between the ends of the latter. The said working magazine 169 is designed to contain a number of the blank disks nested one upon the other, and the said cup-like magazine 169 is open at the bottom, whereby the bottom blank disk of the pile within the magazine will rest on the bottom of the guideway 163, directly in the path and line of movement of the transferring-slide 162, so that when the said slide is thrust rearwardly the same will engage with the bottom blank disk and transfer it from the working magazine onto the anvil in the manner described. Inasmuch as the said working magazine 169 is only designed to contain a limited supply of the blank disks available for direct transfer to the anvil of the stamping mechanism, there is preferably associated with the said magazine a supplemental revoluble turret storage-magazine 170. This revoluble turret storage-magazine 170 comprises a cylindrical body essentially consisting of the upper and lower head-sections 171 and 172 and a cylindrical or circular group of upright supply-tubes 173, suitably united to provide a rigid turret structure. In addition to the head-sections carrying the united supply-tubes the cylindrical body of the turret magazine 170 also includes a central pivot-standard 174, preferably of tubular form, and the lower end of which is adapted to be detachably fitted over the upper journal extremity 175 of the supporting-post 176, bolted or otherwise rigidly mounted at one end of a bracket-arm 177, offset from one side of the base member 11 of the main frame. The upper extremity of the central pivot-standard 174 of the turret-magazine is adapted to detachably engage with the bearing-socket 178, provided in one end of a bearing-bracket 179, offset from the upper part of the frame and providing means, in conjunction with the supports 176 and 177, for the detachable and revoluble mounting of the turret-magazine in a position for movement over the working magazine 169, from which the individual blank disks are removed by the transferrer-slide. It is preferable to fasten the turret-magazine in the position referred to, and this may be accomplished through the medium of a latch-bar 180, pivotally mounted, as at 181, upon the upper bearing-bracket 179 and provided adjacent to its pivot end with an engaging fork 182, adapted to take over the upper end of the pivot-standard 174, and thereby detachably retain the same within the bearing-socket 178. Other equivalent means could be employed for effecting this result.

All of the upright supply-tubes 173 of the turret-magazine body 170 are of the same construction and are provided with the same equipment. Each of said tubes 173 is open at the bottom to permit of the continuous transfer of the blank disks therein into the working magazine 179 until the disks are completely exhausted from the tube, and each of said tubes is further provided in one side thereof with a longitudinally-disposed guiding-slot 183, through which projects and within which works a downwardly-projecting tappet-lug 184, having a rigid fastened connection with a floating follower 185, supported on the pile of disks within the tube and having a guide-opening 186, engaging the guiding rod or wire 187, arranged longitudinally within the tube in proximity to one side thereof and designed to have the entire pile of blank disks strung thereon by passing the eyelets over the rod or wire 187. The stationary guiding rods or wires, which extend longitudinally through the individual supply-tubes 173 of the turret storage-magazine, serve to maintain the blank disks always in proper position that when transferred onto the rotatable anvil the first letter on each disk will commence at the same distance from the eyelet unless the position of the disk is readjusted or reset through the medium of the auxiliary blank-setting device previously described. The filled supply-tubes 173, which are out of register with the working magazine 169, and hence are not in use, are designed to be closed at their lower open ends through the medium of the automatically-adjusted cover-plates 188. These cover-plates 188 are arranged radially with reference to the axis of rotation of the turret-magazine body, and each of the same is provided with an inner pivot-arm extension 189, having a pivotal mounting 190 upon the lower end portion of the pivot-standard for the magazine-body, as may be plainly seen from Figs. 8 and 16 of the drawings. Each of the said pivotal cover-plates 188, mounted as described or in an equivalent way, has connected thereto one end of a holding-spring 191, the other end of which spring is connected to a fixed point of attachment, as at 192, upon the body of the magazine, conveniently at the upper end thereof. The individual holding-springs 191 for each of the cover-plates 188 is designed to be arranged between adjacent supply-tubes 173 and so disposed with relation to the cover-plate as to hold the same in either of its adjusted positions—namely, over the open bottom of the supply-tube with which it is associated or within the space between the lower ends of adjacent tubes. In this connection it is to be observed that when the cover-plate 188 is displaced from beneath the open bottom of its supply-tube it passes to a position at one side of such tube and is drawn up into the space between such tube and an adjacent tube, so that it will pass above the plane of the top edge of the working magazine 169. The displacement of a cover-plate from beneath the open bottom of its supply-tube to the position referred to is accomplished by the engagement of the edge of such plate with the top edge of the working magazine 169, so that the uncovered supply-tube may pass over and into proper register with the said magazine 169, whereby there may be a continuous supply of blanks from the uncovered supply-tube to the working magazine. As the supply of blanks in an individual tube 173 of the turret-magazine becomes depleted the follower 185 lowers and carries with it the outwardly-projecting tappet-lug 184, so that by the time such supply-tube has become entirely exhausted the follower 185 will reach the bottom of such tube, and thereby carry the outwardly-projecting tappet-lug 184 thereof to an interfering position with relation to the strike end 193 of the segmental or bowed magazine-actuator 194. This magazine-actuator 194 has a sweeping movement at one side of the working magazine 169 and acts as a propelling-pawl for the magazine. The said actuator or propelling-pawl 194 is provided at one end with a pivot-collar 195, loosely turning upon the supporting-post 176 for the turret-magazine and having suitably connected therewith one end of a retracting-spring 196, the other end of which is connected to a fixed point of attachment, whereby the actuator 194 is drawn back to an inoperative position upon each return stroke of the transferrer-slide 162, which transferrer-slide is provided with an upstanding operating lug or projection 197, which moves against the actuator 194 on the back stroke of the slide to provide for swinging the strike end 193 in a direction toward and against the tappet-lug 184 of a completely-lowered follower 185, as plainly shown in Fig. 8 of the drawings. The actuator 194 operates upon each movement of the transferrer-slide; but this movement is an idle one, except when a follower has reached the position shown in Fig. 8 and the turret-magazine is ready to be turned to bring a filled supply-tube over and in register with the working magazine. When this turning movement takes place, the turret-magazine is arrested precisely in alinement and register with the working magazine by the tappet-lug 184 of the filled tube coming against the upright guide-bar 198, fitted to the base member of the main supporting-frame. The said upright guide-bar 198 is provided with a straight guiding edge 199, along which the tappet-lug 184 of the supply-tube in use follows until it reaches its lowermost position into interference with the path of movement of the actuator 194. When the tappet-lug reaches this position, it passes below the plane of the lower edge of the bar 198, so that the turret-magazine may be turned to bring a filled tube into position. Backward movement of the turret-magazine after adjustment is prevented through the medium of a spring-pawl 200, secured fast at one end, as at 201, to a fixed point of attachment on the frame, and whose free end is adapted to coöperate with the keeper-notches 202, formed in the upper peripheral edge of the magazine-body. By reason of the adjustable mounting of the turret storage-magazine the same may be readily removed for purposes of recharging, and as each of the supply-tubes 173 is filled with its supply of blank disks strung on the guiding rod or wires 187 the cover-plate 188 for such tube is swung over the open end thereof, so as to hold the disks in place when the magazine is inverted and mounted up again in operative relation to the working magazine 169.

The specific action of the different mechanisms constituting the machine has already been pointed out at length, and it will therefore be now readily understood that the general operation of the machine or press to provide for procuring a disk with a name and address or other matter stamped thereon is to first introduce a coin or check of proper value into the coin-slot 2 to direct the coin between the motion-transmitting element 100 and the feed-lever element 103, then turn the swinging indicator 7 to the indication "Start" on the character-dial, and press down the exterior operating-handle 42. This operation provides for positioning a blank disk upon the rotatable anvil against the abutment or abutment-spring 168, as previously explained. After this operation the indicator 7 is successively moved to the different character indications on the dial to spell out a name and address or other matter and the operating-handle pressed downward once for each character to effect a stamping or printing upon the blank through the medium of the individual die or type elements 22. After the completion of the stamping or printing operation the indicator 7 is turned to the indication "Finish," whereupon by pressing down the operating-handle provides for the release of the holding device or clamp from the disk, so that it may be automatically ejected or displaced from the anvil by the self-acting swinging ejector 203. This self-acting swinging ejector 203 is in the form of an upright swinging plate having a hinge-mounting 204 at one edge upon a suitable hinge-support 205, carried by the base member of the frame, thereby leaving one edge of the plate free to project into the plane of the anvil and swing over the same, as plainly shown in Figs. 5 and 10 of the drawings. The upright ejector 203 is normally drawn in a direction away from the base member of the main supporting-frame by an actuating-spring 206, connected at one end to the plate 203 at one side of its hinge and at its other end connected to a fixed point of attachment, as at 207. Under the influence of the spring 206 the swinging ejector 203 is normally held in the path of movement of the transferrer-slide 162, so that when such slide carries a blank disk on to the rotatable anvil the ejector-plate is moved back out of the way by the pressure of the disk thereon. The ejector-plate maintains its pressure upon the edge of the disk while held clamped upon the anvil, so that when the holding device or clamp is released from the disk the ejector is freed under the action of the spring 206 to displace the stamped disk from the anvil and discharge the same into the delivery-chute 208, fitted in the bottom portion of the supporting-framework and declining forwardly toward the discharge-slot 4, through which the stamped or printed disk passes into the exterior delivery cup or tray 3. It has already been explained that to provide for bringing the separate characters of the individual die or type elements into a stamping or printing position it is necessary to have a relative shifting movement in a circular plane between the die-holder and the blank to be operated upon. Either may therefore be shifted to positions for bringing the individual die or type elements into play. In the construction of machine already described the die-holder is in the form of a die-wheel shiftable in a fixed circular plane to bring the individual die or type elements into proper position over the support or anvil for the blank disk; but a practical modification embodying a reversal of this idea is disclosed in Figs. 23 and 24 of the drawings.

In the modification of the machine shown in Figs. 23 and 24 of the drawings the die-holder is stationary or fixed, while the blank-support or anvil and the instrumentalities directly associated therewith are shiftable to provide for bringing the blank into proper position for receiving the impress of the selected die or type element. Even in carrying out this relative mounting of the die-holder and the blank-support or anvil various expedients may be employed for actuating the individual die or type elements and also for the handling of the blank; but, referring particularly to the illustrative arrangement shown in Figs. 23 and 24 of the drawings, the numeral 1ᵃ designates the cabinet or casing, within which is mounted the stationary die-holder 10ᵃ. The stationary die-holder 10ᵃ is in the form of a ring or circular body held in its stationary or fixed position by being suitably mounted upon stationary supports or brackets 210, suitably located within the casing. The die-holder or die-ring 10ª embodies the essential elements of the die-holder 10, previously described, and has mounted therein in properly-spaced relation a continuous circular series of individual blank die or type elements 22ª, yieldingly held in a retracted position through the medium of the die-holding springs 25ª, and over the entire circular series of the said individual die or type elements 22ª there is designed to be shifted the vertically-reciprocating plunger die-actuator 47ª, mounted to work through suitably-alined guides 211, carried by the circularly-shiftable blank-carrier 212. The circularly-shiftable blank carrier 212 is housed entirely within the casing or cabinet 1ª and may be conveniently in the form of an upright carrying plate or frame supported for a swinging movement at one edge upon the upper and lower carrier-pivots 213 and 214, which in the construction shown are vertically alined and located, respectively, at upper and lower corners of the carrying plate or frame and having a suitable journaled or pivotal connection, respectively, with the upper and lower bearing-brackets 215 and 216, respectively. These bearing-brackets are suitably secured to and offset from one of the inner walls of the casing or cabinet 1ª. The upper pivot 213 has rigidly connected therewith the pivotal adjusting-post 217, extending through the top of the casing or cabinet and having fitted thereon the swinging indicator 7ª, having a play over the character-dial 6ª in the same manner and for the same purpose, as fully explained in connection with the corresponding elements of the construction already described, to provide means for selecting any individual character and bringing the die-actuator 47ª into operative relation directly over the upper end of the selected die or type element. The die-actuator 47ª is normally retracted through any suitable means; but the construction shown has the upper end thereof operatively related to an actuating eccentric or cam 218, provided at the pivoted end of a swinging die-operating lever 219, pivotally supported upon the plate or frame constituting the blank-carrier 212. Opposite its pivotally-supported end the lever 219 has a pivotal connection 220 with the link 221, which is also pivotally connected to the upper end of a reciprocatory adjusting-rod section 222, arranged to work in suitably-alined guides in line with the axis or pivot of the frame 212 and having a universal joint connection 223 at its lower end with one end of an operating-link 224, pivotally connected at its other end, as at 225, to a rock-arm 226, carried by a motion-transmitting rock-shaft 227, journaled in suitable bearings within the lower portion of the casing or cabinet. The said motion-transmitting rock-shaft 227 also has a rock-arm 228, to which is pivotally connected the lower end of a connecting-rod 229, the upper end of which rod is pivotally connected to a rock-arm 230, carried at the inner end of the main operating-shaft 41ª, extending through the side of the casing and carrying upon its outer end the exterior operating crank-handle 42ª. The blank disk B is supported upon the rotatable anvil 54ª in the form of a ratchet-wheel carried upon the upper end of the pivot-axle 56ª. Coöperating with the ratchet-anvil or blank-support 54ª is a swinging pawl-carrier 118ª. The swinging pawl-carrier 118ª essentially consists of a swinging frame pivotally swung upon the axle 56ª in order to have a swinging movement concentric with the axis of the anvil 54ª. The frame constituting the pawl-carrier 118ª essentially comprises the upper and lower frame-arms 231 and 232, respectively, both of which have pivot-collar connections 233 with the pivot-axle 56ª, and the upper of said frame-arms 231 is preferably in the form of a bell-crank carrying at one extremity an upstanding arresting projection 234, having a movement toward and from the inner periphery of the die holder or ring 10ª and adapted to contact with the stops or stop-lugs 124ª, provided upon the die-holder or type-ring for the same purpose as the stops or stop-lugs 124, described in connection with the other form of the invention. The main portion of the bell-crank frame-arm 231 of the pawl-carrier 118ª has pivotally mounted thereon a spacing-pawl 235, held to a working position in engagement with the teeth of the anvil 54ª through the medium of a spring 236, the free end of which spring may be conveniently arranged at one side of the yielding adjuster element 237. The yielding adjuster element 237 is in the form of a leaf-spring secured fast at one end to the body of the frame 118ª and performing the same function as the lever 129 and its spring 135. (Shown in Fig. 15 of the drawings.) In the form of the invention now being described the said yielding adjuster element 237 is arranged to have the free end thereof engaged by the actuating-cam projection 238, projected from one side of the cam-wheel 239, pivotally mounted upon the shiftable blank-carrier 212 and having an arm 240 pivotally connected to the lower end of an operating-link 241. The upper end of this link is pivotally connected to an intermediate point of the die-operating lever 219. The construction described necessarily permits the spring 237 to have a full movement each time, while the play of the pawl-carrier is regulated by the contact of the projection 234 with the stops 124ª. The blank disk is held upon the anvil 54ª through the medium of the presser-clamp 59ª, carried at the lower end of a clamping-spindle 60ª, working through suitably-arranged guides upon the blank-carrier and normally thrust downward through the medium of a pressure-spring 70ª. The said spindle 60ª also has arranged thereon an abutment-collar 242, beneath which is arranged a lifting-lever 243. The lever 243 is pivoted at one end upon the blank-carrier 212 and has its other end arranged over and in operative relation to one arm of an adjusting bell-crank lever 244, pivoted at its angle, as at 245, upon a fixed support and having its pendent arm projecting into the path of an actuating-shoulder 246, provided upon a feed-slide 247. The spring 248 is arranged at one side of the pivotal support of the bell-crank 244 to normally hold this element in and return it to an inactive position. The feed-slide 247 may or may not be associated with a coin-controlled device, but in the construction being described is shown as normally extending through one side of the casing and having exterior to the latter an operating handle or button 248ª. The said slide 247 works within a guideway 249, supported within the casing in the horizontal plane of the supporting-face of the anvil 54ª and extending over a magazine 250, within which is arranged the blank disks, which are pressed upward through the medium of a spring-actuated follower 251. The guideway 249 is of flanged formation to hold the top disk of the pile within the magazine, so that when the slide 247 is thrust inward it transfers such disk onto the anvil 54ª. At the time of operating the feed-slide the indicator 7ª is turned to the indication "Start" upon the dial, so as to bring the lever 243 in operative relation over the bell-crank 244, so that when the feed-slide 247 is thrust inward to transfer a blank disk onto the anvil the same movement causes the bell-crank 244 to be actuated, and the same in turn operates against the lever 243 to lift up the presser-clamp 59ª, so that the blank may be positioned upon the anvil. After the blank disk has been stamped or printed the indicator 7ª is turned to the indication "Finish" upon the character-dial, in which position the lifting-lever 243 becomes engaged by the release-pin 252, carried by the connecting-rod 229. This engagement takes place upon the final movement of the handle 42ª, and the same causes the presser-foot to be lifted from the stamped or printed disk, thus leaving the same free to be automatically kicked off or ejected through the medium of an ejector 253. This ejector is preferably in the form of a spring secured fast at one end to the blank-carrier and having its other free end arranged over the anvil so as to engage with the disk thereon. When the ejector-spring 253 comes into play, the stamped disk is thrown into the delivery-chute 254 and extends outside of the casing or cabinet.

Another expedient that may be resorted to in the carrying out of the invention is suggested in Fig. 27 of the drawings—namely, that of associating with the die-holder an inking device so arranged as to ink the printing-faces of the dies or type should it be desired to utilize the machine for stamping inked characters upon the blank disks, especially in cases where such disks might be made of paper or equivalent material. In the figure of the drawings referred to an inking-roller 255 is illustrated as being arranged in a position beneath the type-wheel form of die-holder 10 and suitably supplied with ink, so that as the type-wheel is revolved in the adjustment thereof the printing-faces of the dies or type will necessarily be passed over the inking-roller and supplied with ink therefrom. Any equivalent expedient could of course be associated with the die-holder, whether of the revolving or stationary form.

From the foregoing it is thought that the construction, operation, and many advantages of the herein-described machine will be readily apparent without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. In a stamping-press, blank-handling mechanism having a rotatable anvil-support and also comprising means for positioning, temporarily holding, releasing, and delivering a blank, spacing mechanism coöperating with said support to effect a step-by-step movement thereof, a rotatable die-holder having a plurality of plunger die elements, means for selecting the individual die elements for the printing position, and an operating mechanism having means for actuating the spacing mechanism and also for actuating the selected plunger die element.

2. In a stamping-press, blank-handling mechanism having an anvil-support for the blank and comprising means for positioning, temporarily holding, releasing, and delivering a blank, a die-holder in the form of a rotary type-wheel bearing a plurality of spring-retracted plunger die elements and provided with an upstanding circular centering-rack, and operating mechanism including an actuator for the selected die elements, and a combined setting and registering dog coöperating with the rack of the wheel.

3. In a machine of the class described, blank-handling mechanism having an anvil-support for the blank and also comprising means for positioning, temporarily holding, releasing, and delivering a blank, a die-holder in the form of a rotary type-wheel bearing a plurality of spring-retracted plunger die elements and having a centering-rack, spacing mechanism for effecting character spacing, an operating mechanism including an actuator for the selected die element, and a combined setting and registering dog having members coöperating respectively with the rack of the type-wheel and also with the spacing mechanism for actuating the latter.

4. In a machine of the class described, blank-handling mechanism having a rotatable anvil-support for the blank and also comprising means for positioning, temporarily holding, releasing, and delivering a blank, spacing mechanism coöperating with the anvil-support to effect a step-by-step movement thereof, a die-holder in the form of a rotary type-wheel overlapping the anvil-support and provided with a plurality of movable die elements and a centering-rack, means for selecting the individual die elements, and operating mechanism including a reciprocatory plunger-actuator for the selected die element, and a reciprocatory combined setting and registering dog having separate members coöperating respectively with the said rack and the spacing mechanism for the anvil-support.

5. In a machine of the class described, blank-handling mechanism having a rotatable anvil-support for the blank, spacing mechanism for the support including a pawl-carrier and an advancing member, a die-holder in the form of a rotary type-wheel bearing a plurality of die elements and having a centering-rack, and an operating mechanism including a main working shaft, a reciprocatory die-actuating plunger operated from the shaft, and a reciprocatory dog also operated from said shaft and having separate members coöperating respectively with the rack of the type-wheel and the advancing member of the pawl-carrier.

6. In a machine of the class described, a blank-handling mechanism having an anvil-support in the form of a ratchet-wheel, spacing mechanism including a swinging pawl-carrier having a pawl coöperating with the ratchet-wheel and also having an advancing member, a die-holder in the form of a rotary type-wheel, and operating mechanism including a main working shaft, a reciprocatory die-actuating plunger operated from said shaft, and a reciprocatory combined setting and registering plunger coöperating with the type-wheel and also with the advancing member of the pawl-carrier.

7. In a machine of the class described, blank-handling mechanism having an anvil-support in the form of a ratchet-wheel, character-spacing mechanism essentially comprising a swinging pawl-carrying frame bearing a pawl coöperating with the ratchet-wheel and an operating-lever yieldingly connected with the frame, said operating-lever being provided with an advancing member, a rotary type-wheel bearing die elements, and operating mechanism including a main working shaft, a reciprocatory die-actuator plunger, and a reciprocatory combined setting and registering dog having separate members coöperating respectively with the type-wheel and with the advancing member for the pawl-carrier of the spacing mechanism.

8. In a machine of the class described, blank-handling mechanism having a rotatable support in the form of a ratchet-wheel, character-spacing mechanism comprising a pivotally-supported swinging pawl-carrying frame having a member provided with a pendent arresting projection, and an operating-lever pivotally supported on the frame and having a yielding connection therewith, said operating-lever for the pawl-carrying frame also being provided with an arm extension constituting an advancing member, a rotary die-holder in the form of a wheel bearing thereon stops of varying projection with which coöperates the arresting projection of the pawl-carrying frame, and operating mechanism including a die-actuator for the selected die, and a dog having a member operating against the advancing member for the pawl-carrying frame of the spacing mechanism.

9. In a machine of the class described, blank-handling mechanism having a step-by-step rotated anvil-support and also comprising means for positioning, temporarily holding, releasing, and delivering a blank, a rotary die-holder including a type-wheel bearing the individual die elements, and a die-adjusting shaft provided at one end with a selecting member or actuator, and operating mechanism having means, operated from a common shaft, for acuating the selected die element and also for effecting character-spacing through the movement of the anvil-support.

10. In a machine of the class described, printing mechanism having individual die elements, the blank-handling mechanism having a rotatable anvil-support, and an auxiliary blank-setting device comprising means for varying the position of the anvil-support.

11. In a machine of the class described, printing mechanism having individual die elements, blank-handling mechanism having a rotatable anvil-support for the blank, and an auxiliary blank-setting device having a geared connection with the anvil-support to provide for varying the position thereof.

12. In a machine of the class described, printing mechanism having individual die elements, blank-handling mechanism having a rotatable anvil-support, and an auxiliary blank-setting device including an adjusting-shaft bearing an indicator and having a geared connection with the anvil-support.

13. In a machine of the class described, printing mechanism having individual die elements, blank-handling mechanism having a rotatable anvil-support for the blank, and an auxiliary blank-setting device including an adjusting-shaft, and a ratchet-gear connection between said shaft and the anvil-support.

14. In a machine of the class described, printing mechanism having individual die elements, blank-handling mechanism having a rotatable anvil-support for the blank, and an auxiliary blank-setting device including an adjusting-shaft bearing an indicator and ratchet interlocked wheels having a geared connection with the anvil-support.

15. In a machine of the class described, printing mechanism having individual die elements, blank-handling mechanism having a rotatable anvil-support for the blank, and an auxiliary blank-setting device including an adjusting-shaft bearing upon its exterior end an indicator, a ratchet adjusting-wheel made fast to said shaft, a setting-gear loose upon the said shaft and bearing a pawl coöperating with said ratchet adjusting-wheel, and a gear-wheel fast with the anvil-support and meshing with the said setting-gear.

16. In a machine of the class described, printing mechanism having individual die elements, blank-handling mechanism having a rotatable anvil-support for the blank, and an auxiliary blank-setting device comprising a spring-returned adjusting-shaft bearing an indicator and having a ratchet-gear connection with the anvil-support, a ratchet-locking device for holding the shaft in its adjusted position, and mechanism for releasing the ratchet-locking device by the finishing operation of the machine.

17. In a machine of the class described, printing mechanism having individual die elements, blank-handling mechanism having a rotatable anvil-support for the blank, a blank-holding device including a lifting member, and an auxiliary blank-setting device comprising an adjusting-shaft having a ratchet-gear connection with the anvil-support and bearing a ratchet-locking disk, and a pivotally-supported pawl-frame bearing a catch-pawl coöperating with said locking-disk and having an element moved against by the lifting member of said holding device at the finishing operation.

18. In a machine of the class described, printing mechanism having individual die elements, blank-handling mechanism including an anvil-support for the blank and comprising means for positioning and delivering the blank, a holding device for clamping and releasing the automatically-positioned blank upon the anvil, and controlling mechanism comprising means for setting and releasing the holding device respectively after the positioning of a blank and at the completion of the stamping operation.

19. In a machine of the class described, printing mechanism having individual die elements, blank-handling mechanism including an anvil for the blank and comprising means for positioning and delivering the blank, a holding device for clamping and releasing the automatically - positioned blank upon the anvil-support, controlling mechanism for the holding device, and operating mechanism coöperating with said controlling mechanism to provide for setting and releasing the holding device respectively after the positioning of a blank and at the completion of the stamping operation.

20. In a machine of the class described, printing mechanism having individual die elements, blank-handling mechanism having a rotatable anvil, a holding device including a movable clamping - spindle carrying a presser-foot for clamping upon the blank, said clamping-spindle being rotatable with the anvil, and mechanism comprising means for moving the clamping-spindle in directions for setting and releasing purposes.

21. In a machine of the class described, printing mechanism having individual die elements, blank-handling mechanism having a rotatable anvil, a holding device having a reciprocatory and rotatable clamping-spindle bearing a presser-foot, operating mechanism, a clutch arranged to provide an operative connection between the operating mechanism and the holding device, and means for controlling the adjustment of said clutch.

22. In a machine of the class described, printing mechanism having individual die elements, blank-handling mechanism having an anvil for the blank, a holding device including a spindle bearing a presser-foot, an operating device, a clutch arranged to provide an operative connection between the operating device and the spindle of the holding device, and means for controlling the adjustment of said clutch through the action of the operating device.

23. In a machine of the class described, printing mechanism, blank-handling mechanism having a rotatable anvil-support, a holding device essentially comprising a reciprocatory and rotatable clamping-spindle bearing a presser-foot, and a spring-pressed clamp-carrying bracket interlocked with the clamping-spindle, an operating device, a clutch arranged to provide an operative connection between the said operating device and the clamp-carrying bracket, and a clutch-shifter coöperating with said clutch and controlled through the movement of the operating device.

24. In a machine of the class described, printing mechanism, blank-handling mechanism including an anvil for the blank and a feed-lever element, a holding device for the blank including a reciprocatory and rotatable clamping-spindle bearing a presser-foot, and a spring-pressed clamp-carrying bracket interlocked with the spindle, an operating device, a clutch arranged to provide an operative connection between the operating device and the said bracket, a clutch-shifter coacting with the clutch for adjusting the position thereof, and also having an operative connection with said feed-lever element, and a motion - transmitting element operable from the operating device and having a self-releasable clutch connection with the feed-lever element, said motion-transmitting element also acting as a holder for said clutch-shifter.

25. In a machine of the class described, printing mechanism, blank-handling mechanism including a rotatable anvil for the blank, and a feed-lever element having a supplemental holding-stud, a holding device for the blank including a movable clamping-spindle having a spring-pressed bracket member, an operating device having a lifting-cam, a clutch member consisting of a pivotally-mounted spring - adjusted lever carrying a clutch rod or finger adapted to provide an operative connection between said lifting-cam and the bracket member of the spindle, a clutch-shifter consisting of a pivotally-supported oscillating lever provided with a release-arm bearing an adjusting-pin or projection coöperating with the clutch member, said oscillating lever being further provided at an intermediate point with an offstanding latch-arm and at one end with a curved guide-section arranged for engagement by the supplemental holding-pin of the feed-lever element, an operating-spring connected with the said oscillatory lever and tending to normally move the same in a direction for adjusting the clutch member out of action, arresting means for checking the clutch-shifter against movement at the finishing operation, and a motion-transmitting element operable from the operating device and having a releasable clutch connection with the feed - lever element, said motion-transmitting element having a holding stud or pin coöperating with the latch-arm of the clutch-shifter lever.

26. In a machine of the class described, printing mechanism, a blank-support, a magazine for the blanks, blank-feeding mechanism comprising means for transferring a blank onto the support, operating mechanism for stamping and spacing purposes, and a self-releasable clutch connection between the blank-feeding mechanism and the said operating mechanism.

27. In a machine of the class described, printing mechanism, a support for the blank, blank-feeding mechanism comprising means for positioning a blank onto the support and including a lever element, operating mechanism for stamping and spacing purposes, and a motion-transmitting element operable from said operating mechanism and having a self-releasable clutch connection with said feed-lever element.

28. In a machine of the class described, printing mechanism, a support for the blank, blank-feeding mechanism comprising means for positioning a blank onto the support and including a feed - lever element, operating mechanism for stamping and spacing purposes, and a motion-transmitting element operable from the operating mechanism and having a temporary clutch connection with the feed-lever element, said clutch connection being self-releasable during the initial movement in unison between the said two elements 29. In a machine of the class described, printing mechanism, a support for the blank, a guideway, a working magazine arranged over and in communication with the guideway, blank-feeding mechanism including a transferrer-slide working in the guideway and through the working magazine, and operating mechanism for stamping and spacing purposes, said operating mechanism including a motion-transmitting element having a self-releasable clutch connection with the blank-feeding mechanism.

30. In a machine of the class described, printing mechanism, a support for the blank, a yielding abutment arranged over the support, a swinging self-acting spring-actuated ejector arranged to sweep over the support, and blank-feeding mechanism including a transferrer arranged to move the blank onto the support against the ejector and said abutment.

31. In a stamping-press, the combination with the printing mechanism and the blank-handling mechanism including a transferrer, of a working magazine for holding the blanks acted upon by the transferrer, a separate storage-magazine having a plurality of supply-chambers individually registrable with the working magazine, and means for moving a filled supply-chamber into registration with the working magazine after the chamber in use has been emptied of its blanks.

32. In a stamping-press, the combination with the printing mechanism and the blank-handling mechanism having transferring means, of a working magazine for the blanks acted upon by the transferring means, a storage-magazine having a plurality of supply - chambers individually registrable with the working magazine, means for holding a supply - chamber in registration with the working magazine until the former is emptied, and means for adjusting the storage-magazine to bring a filled supply-chamber into registration with the working magazine.

33. In a stamping-press, the combination with the printing and blank-handling mechanisms, of a working magazine, a storage-magazine having a plurality of supply-chambers individually registrable with the working magazine, means for holding a supply-chamber in registration with the working magazine until the former is emptied, and means for automatically adjusting the storage-magazine to bring a filled supply-chamber into registration with the working magazine.

34. In a stamping-press, the combination with the printing and blank-handling mechanisms, of a working magazine, a storage-magazine having a plurality of supply-chambers individually registrable with the working magazine, means for holding a supply-chamber in registration with the working magazine until the former is emptied, and means for automatically adjusting the storage-magazine to bring a filled supply-chamber into registration with the working magazine through the action of the blank-feeding mechanism.

35. In a machine of the class described, the combination with the printing and blank-handling mechanisms, of a working magazine, a rotatable turret storage-magazine having a plurality of supply-tubes individually registrable with the working magazine and each having a follower provided with a tappet projection, and a magazine-actuator operable from the blank-handling mechanism and adapted to engage against the individual tappet projections when the latter pass into the path of the actuator.

36. In a machine of the class described, the combination with the printing and blank-handling mechanisms, of a working magazine, a rotatable turret storage-magazine having a plurality of upright supply-tubes individually registrable with the working magazine and each having a guiding-rod for the blanks, a floating follower working in each supply-tube and having a tappet-lug projecting exterior thereto, and a spring-retracted swinging magazine-actuator operated from the blank-handling mechanism and having a strike member adapted to engage the individual tappet-lugs when the latter pass into the path of movement of the actuator.

37. In a machine of the class described, the combination with the printing and blank-handling mechanisms, of a working magazine, a rotatable turret storage-magazine having a plurality of upright supply-tubes individually registrable with the working magazine and each having a guiding-rod for the blanks, a floating follower working in each supply-tube and having a tappet-lug projecting exterior thereto, a spring-retracted swinging magazine-actuator operated from the blank-handling mechanism and having a strike member adapted to engage the individual tappet-lugs when the latter pass into the path of movement of the actuator, and a rigid guiding-bar arranged to constitute a check and guide engaged by the tappet-lug of the filled supply-tube brought into register with the working magazine.

38. In a machine of the class described, the combination with the printing and blank-handling mechanisms, of a working magazine, and a storage-magazine having a plurality of supply-tubes each open at its lower end and an automatically-adjusted cover-plate arranged to cover and uncover the open end of each supply-tube.

39. In a machine of the class described, the combination with the printing and blank-handling mechanisms, of a working magazine, and a rotatable storage-magazine having a plurality of supply-tubes open at their lower ends and individually registrable with the working magazine, and a spring-held cover-plate arranged to cover and uncover the open end of each supply-tube and having a pivotal support at one end, each cover-plate when in a closed position being adapted to be displaced to an uncovering inactive position by contact with the working magazine.

40. In a machine of the class described, printing mechanism, blank-handling mechanism, means for effecting a stamping of the characters in a circle upon the blank, a holding device for the blank, an operating device having a self-releasable clutch connection with the blank-handling mechanism, and means for automatically throwing the holding device in and out of action.

41. In a stamping-press, printing mechanism, blank-handling mechanism, and an auxiliary blank-setting device comprising means for setting the blank to variable positions in its printing position.

42. In a stamping-press, printing mechanism, blank-handling mechanism comprising means for positioning the blank, and an auxiliary blank-setting device comprising means for varying the printing position of the blank.

In testimony whereof I affix my signature in presence of two witnesses.

HENRY C. LAVERY.

Witnesses:
SOLON L. PERRIN,
H. J. OBRIEN.